United States Patent
Muraoka et al.

(10) Patent No.: US 8,292,273 B2
(45) Date of Patent: Oct. 23, 2012

(54) FLUID FILLED TYPE VIBRATION DAMPING DEVICE

(75) Inventors: Mutsumi Muraoka, Aichi-gun (JP); Satoshi Umemura, Kamo-gun (JP)

(73) Assignee: Tokai Rubber Insustries, Ltd., Komaki-shi (JP)

( * ) Notice: Subject to any disclaimer, the term of this patent is extended or adjusted under 35 U.S.C. 154(b) by 1033 days.

(21) Appl. No.: 12/213,351

(22) Filed: Jun. 18, 2008

(65) Prior Publication Data

US 2009/0001639 A1    Jan. 1, 2009

(30) Foreign Application Priority Data

Jun. 29, 2007  (JP) ................................ 2007-172986

(51) Int. Cl.
    *F16F 13/04*    (2006.01)
(52) U.S. Cl. ................................. 267/140.13
(58) Field of Classification Search ............. 267/140.11, 267/140.13, 140.14
    See application file for complete search history.

(56) References Cited

U.S. PATENT DOCUMENTS

| | | | |
|---|---|---|---|
| 4,697,793 A | | 10/1987 | Reuter et al. |
| 4,762,309 A | * | 8/1988 | Hutchins ................. 267/140.13 |
| 5,167,403 A | * | 12/1992 | Muramatsu et al. ..... 267/140.13 |
| 5,601,280 A | | 2/1997 | Nagaya et al. |
| 6,371,462 B2 | * | 4/2002 | Gennesseaux ........... 267/140.13 |
| 6,409,158 B1 | | 6/2002 | Takashima et al. |
| 6,536,113 B2 | * | 3/2003 | Guillemot ................. 29/896.93 |
| 6,598,864 B2 | | 7/2003 | Freudenberg et al. |
| 6,676,117 B2 | * | 1/2004 | Desmoulins et al. .... 267/140.13 |
| 6,932,332 B2 | * | 8/2005 | Thomazeau ............. 267/140.13 |
| 7,306,210 B2 | | 12/2007 | Happou et al. |
| 2005/0258581 A1 | | 11/2005 | Tanaka |
| 2006/0208405 A1 | | 9/2006 | Muramatsu et al. |
| 2007/0085249 A1 | * | 4/2007 | Happou et al. ........... 267/140.13 |

FOREIGN PATENT DOCUMENTS

| | | |
|---|---|---|
| JP | A 08-074922 | 3/1996 |
| JP | A 2000-291722 | 10/2000 |
| JP | 2002-349631 A | 12/2002 |
| JP | A 2003-148548 | 5/2003 |
| JP | 2004-176837 A | 6/2004 |
| JP | 2005-337463 A | 12/2005 |
| JP | 2006-258184 A | 9/2006 |

OTHER PUBLICATIONS

Office Action issued Dec. 2, 2011 in Japanese Patent Application No. 2007-172986 (with English translation).

* cited by examiner

*Primary Examiner* — Robert A Siconolfi
*Assistant Examiner* — Stephen Bowes
(74) *Attorney, Agent, or Firm* — Oliff & Berridge, PLC

(57) ABSTRACT

A fluid filled type vibration damping device having a pressure-receiving chamber and an equilibrium chamber disposed on either side of a partition member. A movable cover member juxtaposed against the partition member from the pressure receiving chamber side to cover a communicating hole of the partition member. An outside peripheral edge of the movable cover member is held in intimate contact against the partition member through urging force of an elastic retainer portion. Pressure of both chambers will acts on both faces of a movable rubber film, thereby constituting a pressure fluctuation absorbing mechanism. The outside peripheral edge of the movable cover member is separated from the partition member in opposition to the urging force by negative pressure in the pressure receiving chamber for providing a shunting mechanism for preventing excessive negative pressure in the pressure receiving chamber.

12 Claims, 10 Drawing Sheets

FLUID FILLED TYPE VIBRATION DAMPING DEVICE

INCORPORATED BY REFERENCE

The disclosure of Japanese Patent Application No. 2007-172986 filed on Jun. 29, 2007 including the specification, drawings and abstract is incorporated herein by reference in its entirety.

BACKGROUND OF THE INVENTION

1. Field of the Invention

The present invention relates to a fluid filled type vibration damping device which is adapted to provide vibration damping action based on flow effects, such as the resonance effect, of fluid through an orifice passage interconnecting a pressure receiving chamber and an equilibrium chamber which are filled with a non-compressible fluid. In particular, the present invention is concerned with a fluid filled type vibration damping device which is furnished with a mechanism for absorbing pressure fluctuations in the pressure receiving chamber.

2. Description of the Related Art

A fluid filled type vibration damping device which affords vibration damping action based on flow effects of a non-compressible fluid which fills its interior is one type of vibration damping device known in the art as vibration-damped coupling or vibration-damped support or the like for installation between components which make up a vibration transmission system. This fluid filled type vibration damping device has a first mounting member and a second mounting member which are positioned spaced apart from one another and which are elastically linked by a main rubber elastic body; and a fluid chamber filled with a non-compressible fluid. The fluid chamber is divided by a partition member which is fixedly supported on the second mounting member thereby respectively forming to either side of the partition member a pressure-receiving chamber a portion of whose wall is defined by the main rubber elastic body, and an equilibrium chamber a portion of whose wall is defined by a flexible film, with the pressure receiving chamber and the equilibrium chamber communicating with one another through an orifice passage. With this structure, vibration damping action will be produced on the basis of flow effects such as the resonance effect of fluid flowing through the orifice passage when relative pressure fluctuations between the pressure receiving chamber and the equilibrium chamber occur in association with input of vibration. Implementation of such fluid filled type vibration damping devices in automotive engine mounts, body mounts, diff mounts, or other suspension mounts for example, is a topic of ongoing research.

Vibration damping action which is produced through flow action of a fluid through an orifice passage will be limited to a relatively narrow frequency band to which the orifice passage has been pre-tuned. A resultant problem is difficulty in dealing with the sophisticated vibration damping characteristics which are required.

Accordingly, there has been proposed for example a pressure fluctuation absorbing mechanism which has as an object to suppress the sharp rise in pressure fluctuation occurring during input of vibration which can be a problem in frequency ranges higher than the tuning frequency of the orifice passage, and to thereby stabilize vibration damping action. As taught in U.S. Pat. No. 4,697,793, this pressure fluctuation absorbing mechanism has a structure in which a movable member composed of a rubber film is installed in the partition member which divides the pressure receiving chamber from the equilibrium chamber so that pressure of the pressure receiving chamber will act on a first face and pressure of the equilibrium chamber will act on the other face. The movable member will experience deformation in association with input of vibration in a high frequency band to thereby absorb pressure fluctuation, resulting in avoiding development of high dynamic spring.

In fluid filled type vibration damping devices of the type described above, there are instances in which input of large, jarring vibration load across the first mounting member and second mounting member may cause the vibration damping device to emit noise. Specifically, where the fluid filled type vibration damping device is employed as an automotive engine mount for example, noise and shock of sufficient intensity to be perceptible to passengers in the cabin may be produced when the car drives over grooved pavement, speed bumps, or the like.

Formation of air bubbles, known as cavitation, is a possible cause of such noise and vibration. Such bubbles are produced since the flow of fluid through the orifice passage between the pressure receiving chamber and the equilibrium chamber cannot keep pace with input of a large, jarring vibration load, resulting in excessive negative pressure within the pressure receiving chamber. It is thought that these bubbles then burst, producing water hammer pressure which is propagated through the first mounting member and the second mounting member and transmitted to the car body etc., resulting in noise and vibration which poses a problem as noted above.

U.S. Pat. No. 4,697,793 discloses a fluid filled type vibration damping device as one measure for dealing with this problem. In this fluid filled type vibration damping device, an incision is made in the movable member which is supported on the partition member, so that in the event of an excessive relative pressure differential between the pressure receiving chamber and the equilibrium chamber the movable member will undergo deformation on the basis of the pressure differential, causing the slit to open up so that the pressure receiving chamber and the equilibrium chamber now communicate with one another through the opening. The excessive negative pressure in the pressure receiving chamber will be dispelled thereby so as to suppress the occurrence of cavitation.

However, with the provision of an incision to the movable member, there is risk that, even in instances where excessive positive pressure at a level not requiring the incision to open has been produced in the pressure receiving chamber, the movable member will undergo appreciable elastic deformation causing the incision to open up. As a result, shunting between the pressure receiving chamber and the equilibrium chamber may occur even when the input vibration lies in the tuning frequency band which the orifice passage is intended to damp, resulting in failure to effectively create a relative pressure fluctuation differential between the pressure receiving chamber and the equilibrium chamber, and a consequent insufficient flow of fluid through the orifice passage with an attendant risk that sufficient vibration damping action (high attenuating action) based on flow effects such as the resonance effect of fluid through the orifice passage will be achieved with difficulty.

In view of this problem, in U.S. Pat. No. 7,306,210, the Applicant proposed a structure in which a shunt passage is formed in the partition member to connect the pressure receiving chamber and the equilibrium chamber; a valve body is provided for switching the shunt passage between a communicating state and an obstructed state; and a metal spring is provided for maintaining the obstructed state with the valve body at a prescribed level of initial elastic deformation. With this arrangement, with the pressure receiving chamber under conditions of pressure of ordinary magnitude, the shunt passage will be maintained in the obstructed state through the elastic deforming action of the metal spring so as to ensure a sufficient level of fluid flow though the orifice passage. On the other hand, with the pressure receiving chamber in a condition of excessive negative pressure that may pose a problem, the shunt passage will assume the communicating state in opposition to the elastic deforming action of the metal spring, thus preventing a state of excessive negative pressure from arising in the pressure receiving chamber.

However, providing the partition member with the pressure fluctuation absorbing mechanism described above in addition to the valve results in an overall complicated structure including the partition member, and poses the additional risk of difficulty in assuring sufficient space in the partition member to accommodate the pressure fluctuation absorbing mechanism of the pressure receiving chamber and the shunting mechanism between the pressure receiving chamber and the equilibrium chamber. Hence there was also a risk of difficulty in achieving the objective vibration damping action and noise reducing action on a consistent basis.

SUMMARY OF THE INVENTION

It is therefore one object of this invention to provide a fluid filled type vibration damping device of novel structure that will advantageously afford the desired vibration damping action while at the same time advantageously improving production efficiency, by virtue of ensuring space sufficient to accommodate the pressure fluctuation absorbing mechanism of the pressure receiving chamber and the shunting mechanism between the pressure receiving chamber and the equilibrium chamber when these are provided, as well by as minimizing the number of assembly components.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

The principle of the present invention provides a fluid filled type vibration damping device including: a first mounting member; a second mounting member; a main rubber elastic body elastically connecting the first mounting member and the second mounting member; a partition member fixedly supported on the second mounting member; a pressure-receiving chamber disposed on one side of the partition member and partially defined by the main rubber elastic body; an equilibrium chamber disposed on another side of the partition member and partially defined by a flexible film, the pressure receiving chamber and the equilibrium chamber being filled with a non-compressible fluid; an orifice passage through which the pressure receiving chamber and the equilibrium chamber communicate with one another; and a movable cover member juxtaposed against the partition member on a pressure receiving chamber side thereof to cover at least one communicating hole formed through the partition member for fluid communication between the pressure receiving chamber and the equilibrium chamber, wherein the movable cover member includes: a fastening portion fastened to the partition member; an elastic retainer portion which elastically links the fastening portion to an outside peripheral edge of the movable cover member and which through urging force maintains the outside peripheral edge of the movable cover member in intimate contact against the partition member; and at least one movable rubber film provided in a zone to an inside peripheral side of the outside peripheral edge of the movable cover member, wherein with the outside peripheral edge of the movable cover member held in intimate contact against the partition member through the urging force of the elastic retainer portion, pressure of the pressure receiving chamber will act on a first face of the movable rubber film while pressure of the equilibrium chamber will act on another face of the movable rubber film through the communicating hole thereby constituting a pressure fluctuation absorbing mechanism, and wherein the outside peripheral edge of the movable cover member is separated from the partition member in opposition to the urging force of the elastic retainer portion by negative pressure created in the pressure receiving chamber when vibration is input for releasing the outside peripheral edge of the movable cover member from intimate contact against the partition member, thereby creating a shunt gap and constituting a shunting mechanism for preventing excessive negative pressure from occurring in the pressure receiving chamber.

According to the fluid filled vibration damping device constructed in accordance with the present invention, with the pressure receiving chamber under ordinary pressure, the outside peripheral edge of the movable cover member will be held in fluidtight contact against the partition member thereby preventing pressure in the pressure receiving chamber from leaking through the communicating holes and the movable cover member, so as to ensure a sufficient level of fluid flow through the orifice passage. Additionally, even in instances where the orifice passage becomes substantially clogged due to input of vibration in a higher frequency range than the tuning frequency range of the orifice passage, the pressure in the pressure receiving chamber will be absorbed on the basis of elastic deformation-induced displacement of the movable rubber films which have been provided to the movable cover member. Specifically, with the pressure receiving chamber under conditions of pressure of ordinary magnitude, the outside peripheral edge of the movable cover member will be positioned reliably in intimate contact against the partition member on the basis of the urging force of the elastic retainer portion, and the objective level of displacement of the movable rubber films and sealing capability when covering the communicating holes fluidtightly will be consistently assured. Vibration damping effect based on flow effects such as the resonance effect of fluid through the orifice passage, as well as the effect of avoiding development of high dynamic spring caused by the clogging of the orifice passage, will be afforded advantageously thereby.

On the other hand, when jarring load is input across the first mounting member and the second mounting member resulting in negative pressure in the pressure receiving chamber, particularly where a large pressure differential arises between the pressure receiving chamber and the equilibrium chamber, the pressure differential acting on the front and back of the movable rubber film will become quite large and the outside peripheral edge of the movable cover member will experience displacement entirely or in part towards the pressure receiving chamber side in opposition to the urging force of the elastic retainer portion, and will separate from the partition member. The communicating holes will thereby assume the communicating state and a shunt gap will be produced between the partition member and the outside peripheral edge of the movable cover member so that the pressure receiving chamber and the equilibrium chamber now communicate with each other through the communicating holes and the shunt gap. As a result, it will be possible to prevent a condition of excessive negative pressure from arising in the pressure receiving chamber, to suppress formation of cavitation bubbles, and to advantageously reduce the problem of noise caused by such bubbles.

With this structure in particular, the movable cover member is integrally provided with the movable rubber films which constitute part of the pressure fluctuation absorbing mechanism and with an outside peripheral edge which constitutes part of the shunting mechanism; and the partition member is provided with the pressure fluctuation absorbing mechanism and with the shunting mechanism through fastening of the fastening portion of this movable cover member to the partition member.

As a result, the procedure for handing the pressure fluctuation absorbing mechanism and the shunting mechanism and for attaching them to the partition member is simple, thereby advantageously affording greater production efficiency as well as simplifying the fastening structure thereof to the partition member and making it possible to implement both the pressure fluctuation absorbing mechanism and the shunting mechanism within a small space. Moreover, the freedom in design of the pressure fluctuation absorbing mechanism and the shunting mechanism, as well as of the partition member, may be improved thereby.

Furthermore, since the shunt gap is produced through separation of the outside peripheral edge of the movable cover member from the partition member, a large area for production of the shunt gap is assured along the outside periphery of the movable cover member, and the shunting mechanism will have a simple structure.

For this reason, in the fluid filled type vibration damping device constructed in accordance with the present invention, in addition to advantages such as improved production efficiency, lower cost, and more compact size, by virtue of more consistent pressure fluctuation absorbing action and shunting action will advantageously afford the objective vibration damping effect on the basis of fluid flow effects through the orifice passage, as well as reduced noise and vibration at times of input of jarring load.

Moreover, when large negative pressure in the pressure receiving chamber is dispelled through separation of the outside peripheral edge of the movable cover member from the partition member to place the communicating holes in the communicating state, due to the smaller pressure differential acting on the front and back sides of the movable rubber film, the movable rubber film will be repositioned in intimate contact against the partition member under the urging force of the elastic retainer portion of the movable cover member and the communicating holes will assume the obstructed state. For this reason, reduction in vibration damping effect based on fluid flow action through the orifice passage, which can be caused by pressure escaping from the pressure receiving chamber through the communicating holes, will not be large enough to become a problem.

The material used for the elastic retainer portion as well as the placement structures of the elastic retainer portion and the movable rubber films are not limited in any particular way. For example, the elastic retainer portion may be integrally formed of the same rubber material as the movable rubber films, and the urging force of the elastic retainer portion may be tuned through design modification of its thickness dimension, shape, and so on; or the elastic retainer portion may employ a spring member or other element separate from the movable rubber films, as will be described later. Additionally, it is sufficient for the elastic retainer portion to provide urging force at a level such that the outside peripheral edge of the movable cover member will be held in intimate contact against the partition member by urging force through elastic transmission of the fastening force to the partition member in the fastening portion, to the outside peripheral edge of the movable cover member; and such that when negative pressure sufficient to cause a problem is produced in the pressure receiving chamber, this intimate contact will be released. Specifically, there is no limitation as to whether the level of deformation of the elastic retainer portion is smaller in comparison with the level of deformation of the outside peripheral edge when intimate contact is released. That is, a mode whereby, for example, negative pressure sufficient to cause a problem will be dispelled through appreciable localized deformation of the outside peripheral edge of the movable cover member would be included herein.

The fluid filled type vibration damping device which pertains to the present invention may also employ a structure wherein the orifice passage is formed extending in the circumferential direction through the outside peripheral portion of the partition member, and the at least one communicating hole is formed in the center section of the partition member. Sufficient passage length of the orifice passage may be ensured thereby, and freedom in tuning of vibration damping effect based on flow effect of fluid through the orifice passage may be improved. By forming the communicating holes in the center section of the partition member, the movable rubber films and the shunt gap will be disposed towards the center of the partition member thereby making it a simple matter through deformation of the movable cover member to deal with any localized pressure differential arising between the pressure receiving chamber and the equilibrium chamber, and as a result, liquid pressure absorbing action by the pressure receiving chamber and pressure equilibrium between the pressure receiving chamber and the equilibrium chamber may be more consistently achieved.

Moreover, the fluid filled type vibration damping device which pertains to the present invention may employ a structure wherein, in the movable cover member, the movable rubber film is vulcanization bonded to the elastic retainer portion which is formed of an elastic material different from that of the movable rubber film. The freedom in materials selection for the movable rubber film and for the elastic retainer portion may be expanded thereby. Also, improvement of freedom in tuning the urging force of the elastic retainer portion and the characteristics of the elastic retainer portion, and of the durability of the movable cover member, may be advantageously achieved thereby.

The fluid filled type vibration damping device which pertains to the present invention may also employ a structure wherein the fastening portion of the movable cover member which fastens it to the partition member is disposed in the center section of the movable cover member. A state in which the outside peripheral edge of the movable cover member is free about its entire circumference with respect to the partition member may be achieved thereby so that a location of sufficient size to form the shunt gap is assured, whereby pressure equilibrium between the pressure receiving chamber and the equilibrium chamber may be achieved more efficiently.

Furthermore, the fluid filled type vibration damping device which pertains to the present invention may employ a structure wherein the movable cover member is provided with a plurality of elastic retainer portions which as a whole extend in a radial pattern or spoke-wise fashion from the center of the movable cover member. With such a structure, urging force of the elastic retainer portions will be directed more efficiently on the outside peripheral edge of the movable cover member; and additionally space for placement of the movable rubber films between the plurality of elastic retainer portions in the circumferential direction will be effectively ensured.

Moreover, the fluid filled type vibration damping device which pertains to the present invention may employ a structure wherein a gap is provided between a face of the movable rubber film of the movable cover member, and a face of the partition member onto which the communicating hole opens. With such a structure, contact of the movable rubber film or films against the edges of the communicating hole or holes of the partition member can be inhibited, and in particular it will be possible to avoid stress concentrations which can result from elastic deformation while contacting sections are in contact with one another, thereby affording improved durability of the movable rubber films. Moreover, a large deformation zone for the movable rubber films will be assured, and further improvement in freedom of tuning of pressure absorbing action will be afforded.

The fluid filled type vibration damping device which pertains to the present invention may also employ a structure wherein wherein the fastening portion for fastening to the partition member is provided in a center section of the movable cover member; the outside peripheral edge of the movable cover member is positioned in intimate contact surrounding the communicating holes of the partition member; and a medial section between the center section and the outside peripheral edge of the movable cover member is positioned in opposition to the face onto which the communicating hole opens in a direction of juxtaposition of the movable cover member and the partition member, with a gap provided about the entire circumference between these opposed faces. With such a structure, positioning of the movable cover member with respect to the communicating holes in the partition member is a simple matter; additional advantages include efficiently assuring a location for the shunt gap to form; improved durability due to the fact that contact of the movable cover member against the edges of the communicating holes is avoided; and a satisfactory level of deformation of the movable cover member.

Furthermore, the fluid filled type vibration damping device which pertains to the present invention may employ a structure wherein a continuous sealing rib is provided to the outside peripheral edge of the movable cover member about the entire circumference of a face thereof which is juxtaposed about the communicating hole of the partition member; and the sealing rib undergoes compressive deformation becoming positioned in intimate contact surrounding the communicating hole. With such a structure, sealing capability of the communicating holes by the outside peripheral edge of the movable cover member may be further improved, and pressure leakage from the pressure receiving chamber through the communicating holes may be suppressed more advantageously. Moreover, once the outside peripheral edge of the movable cover member has separated from the partition member to release the outside peripheral edge and the partition member from intimate contact and thereby dispel the marked pressure differential between the pressure receiving chamber and the equilibrium chamber through the shunt gap and the communicating hole or holes, when the movable cover member then returns to its original condition of intimate contact under the urging force of the elastic retainer portions the outside peripheral edge of the movable cover member will come into contact against the partition member via the sealing rib, whereby the sealing rib will perform a cushioning function, thus advantageously suppressing loss of durability and noise caused by striking of the movable cover member against the partition member.

Moreover, the fluid filled type vibration damping device which pertains to the present invention may employ a structure wherein the movable cover member as a whole has a flat plate shape. With such a structure it will be possible to prevent the dimension of the movable cover member in the direction of juxtaposition thereof against the partition member from becoming any greater than necessary, thus advantageously affording compact size in the juxtaposition direction.

The fluid filled type vibration damping device which pertains to the present invention may also employ a structure wherein the movable cover member has a convex bowed shape distended towards the pressure receiving chamber side. With such a structure, a large effective surface area may be assured for the movable rubber film or films which are disposed in the movable cover member, and freedom in tuning of pressure absorbing action may be further improved. In particular, where the movable rubber film or films also have a convex bowed shape distended towards the pressure receiving chamber side, it will be a simple matter to establish a large distance separating the movable rubber films and the partition member, thus preventing contact of the movable rubber films against the edges of the communicating holes in the partition member, and thereby affording advantages such as improved durability of the movable rubber films and assuring a sufficient level of deformation.

Furthermore, the fluid filled type vibration damping device which pertains to the present invention may employ a structure wherein an annular retainer member is disposed at the outside peripheral edge of the movable cover member, and the outside peripheral edge of the elastic retainer portion is linked to the annular retainer member. With such a structure, the rigidity afforded by the annular retainer member may be utilized to further stabilize intimate contact of the outside peripheral edge of the movable cover member against the partition member.

Moreover, the fluid filled type vibration damping device which pertains to the present invention may employ a structure wherein the annular retainer member is formed of a spring material. By so doing, the condition of intimate contact between the movable cover member and the partition member can be tuned advantageously utilizing the elasticity of the spring member, whereby it will be possible, for example, to enable the shunt gap to form rapidly through elastic deformation of the spring member upon release of the movable cover member and the partition member from intimate contact; or with the movable cover member and the partition member placed in intimate contact, for urging force produced by the elasticity of the spring member to act on the outside peripheral edge of the movable cover member in addition to the urging force provided by the elastic retainer portion, thus affording a higher level of intimate contact force.

The fluid filled type vibration damping device which pertains to the present invention may also employ a structure wherein the communicating hole of the partition member and the movable rubber film of the movable cover member have mutually corresponding planar surface shape in a direction of their juxtaposition. With this arrangement, the pressure of the equilibrium chamber can act efficiently on the movable rubber films through the communicating holes, and a satisfactory level of deformation of the movable rubber films may assured, thus further improving the objective liquid pressure absorbing action.

Furthermore, the fluid filled type vibration damping device which pertains to the present invention may employ a structure wherein the communicating hole or holes and the movable rubber film or films which have mutually corresponding planar shapes are aligned in a circumferential direction as well as mutually overlapping in projection view in the direction of juxtaposition of the movable rubber film or films onto the open face or faces of the communicating hole or holes. With this structure, the pressure of the equilibrium chamber will be able to act more efficiently on the movable rubber films through the communicating holes, thus further improving the objective liquid pressure absorbing action.

Moreover, the fluid filled type vibration damping device which pertains to the present invention may employ a structure, wherein the center section of the partition member is of flat shape, the communicating hole take the form of throughholes which pass through the center section of the partition member about a center axis, and the fastening portion of the movable cover member is fastened at the center axis of the partition member. This structure affords a compact arrangement for the pressure fluctuation absorbing mechanism and the shunting mechanism on the side towards the center of the partition member and improve freedom in tuning of the orifice passage and the movable rubber films, as a result of which the desired vibration damping action and cavitation preventing action may be achieved more consistently.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
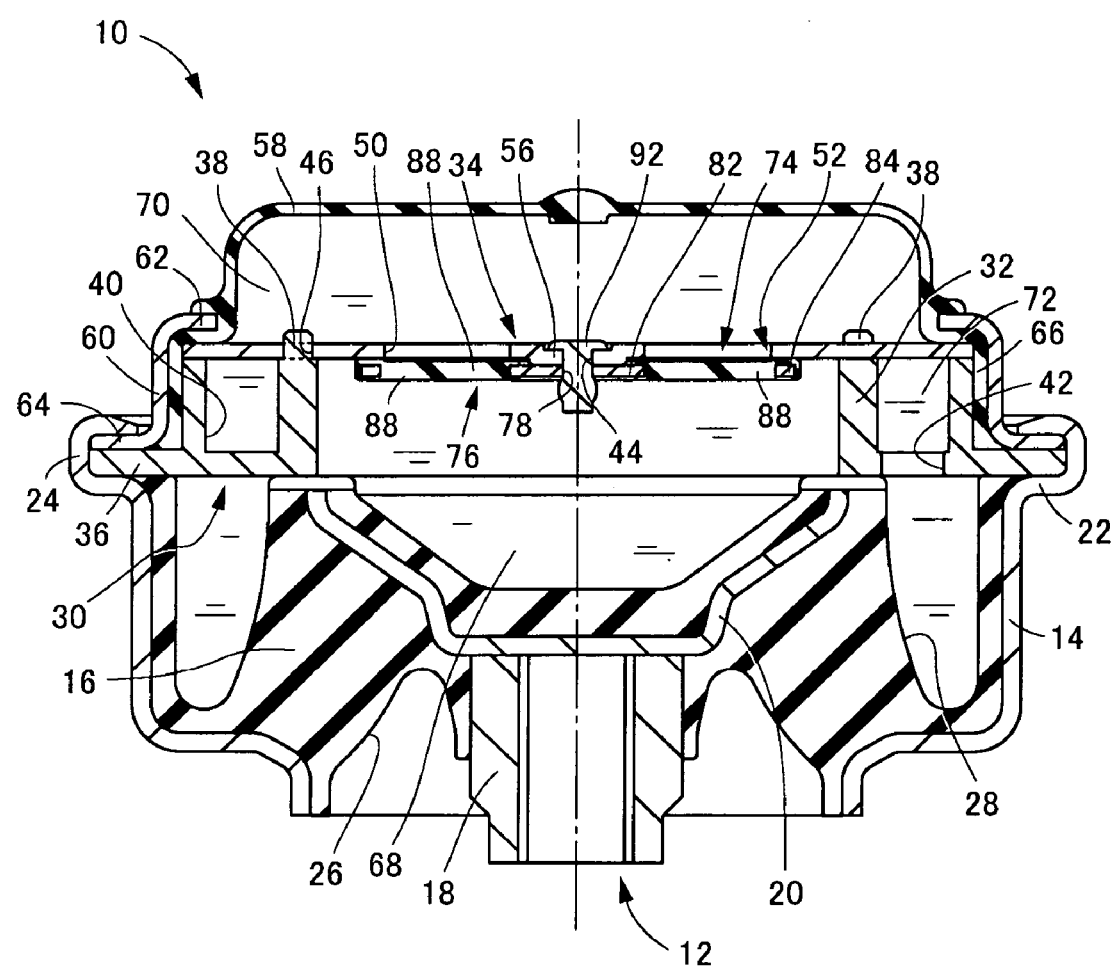
FIG. 1 is an elevational view in axial or vertical cross section of an automotive engine mount of construction according to a first embodiment of the invention, taken along line 1-1 of FIG. 2.

First, FIG. 1 depicts an automotive engine mount 10 by way of a first embodiment which pertains to the fluid filled type vibration damping device of the present invention. This automotive engine mount 10 has a structure in which a first mounting member 12 of metal and a second mounting member 14 of metal are linked by a main rubber elastic body 16. The first mounting member 12 is mounted onto the power unit side, while the second mounting member 14 is mounted onto the vehicle body side, whereby the power unit is supported in vibration damping fashion on the body by being suspended therefrom.

In FIG. 1, the engine mount 10 is shown by itself prior to being installed in the automobile. With the mounting installed in the automobile, the distributed support load of the power unit resulting from suspension of the power unit will be input in the axial direction of the mounting (the vertical in FIG. 1) thereby causing the first mounting member 12 and the second mounting member 14 to undergo relative displacement in the direction away from each other in the axial direction and causing the main rubber elastic body 16 to experience elastic deformation. In this installed state, the principal vibration targeted for damping will be input generally along the axial direction of the mounting. Unless noted otherwise, the vertical direction herein refers to the vertical direction in FIG. 1, which is also the axial direction of the mounting.

Turning now to a more detailed description, the first mounting member 12 includes a tubular fixing member 18 and dish-shaped cup fitting 20 which opens upward. The cup fitting 20 is fastened with its center bottom portion juxtaposed against the upper end section of the fixing member 18. A screw thread is provided on the inside peripheral wall of this fixing member 18, and the first mounting member 12 is fastened to the power unit side by being screwed via a fastening bolt, not shown, to a mounting member situated on the power unit side.

The second mounting member 14, on the other hand, has a large-diameter, generally round tubular shape with an annular shoulder portion 22 which flares diametrically outward formed in its upper part, and with a caulking portion 24 of large-diameter ring shape integrally formed at the outside peripheral edge of the shoulder portion 22 so as to extend upward. The lower part of the second mounting member 14 has an internal flange shape which flares diametrically inward to a greater extent than the axially medial section. The second mounting member 14 is fastened by being force fit into a tubular bracket, not shown, and fastened to the vehicle body via the bracket.

The second mounting member 14 is positioned spaced apart in the diametrical direction to the outside of the first mounting member 12, with the two fitting 12, 14 aligned approximately concentrically. The main rubber elastic body 16 is positioned between the diametrically opposed faces of the first mounting member 12 and the second mounting member 14.

The main rubber elastic body 16 has a thick-walled, generally round tubular shape and is vulcanization bonded at its outside peripheral face to the inside peripheral face of the second mounting member 14 so as to extend from the shoulder portion 22 to the lower end part thereof. Furthermore, the inside peripheral face of the main rubber elastic body 16 is vulcanization bonded to the outside peripheral face from the axially medial section to the upper part of the fixing member 18 in the first mounting member 12 and to the inside and outside peripheral faces of the cup fitting 20. The cup fitting 20 is vulcanization bonded in an embedded state in the main rubber elastic body 16. That is, the main rubber elastic body 16 is formed as an integrally vulcanization molded component which incorporates the first mounting member 12 and the second mounting member 14. The first mounting member 12 and the second mounting member 14 are thereby linked elastically by the main rubber elastic body 16, and the opening at the lower end of the second mounting member 14 is covered fluidtightly by the main rubber elastic body 16 and the first mounting member 12.

On the lower end face of the main rubber elastic body 16, there is formed a lightening recess 26 of concave shape opening towards and between the lower opening of the second mounting member 14 and the lower end of the first mounting member 12, thereby minimizing stress in the lower end section of the main rubber elastic body 16. An outside peripheral recessed groove 28 is formed in the outside peripheral section of the main rubber elastic body 16. The outside peripheral recessed groove 28 extends continuously in the circumferential direction with a cross section which has an opening of elongated slot shape towards and between the upper opening of the second mounting member 14 and the upper opening of the cup fitting 20.

Figure 2:
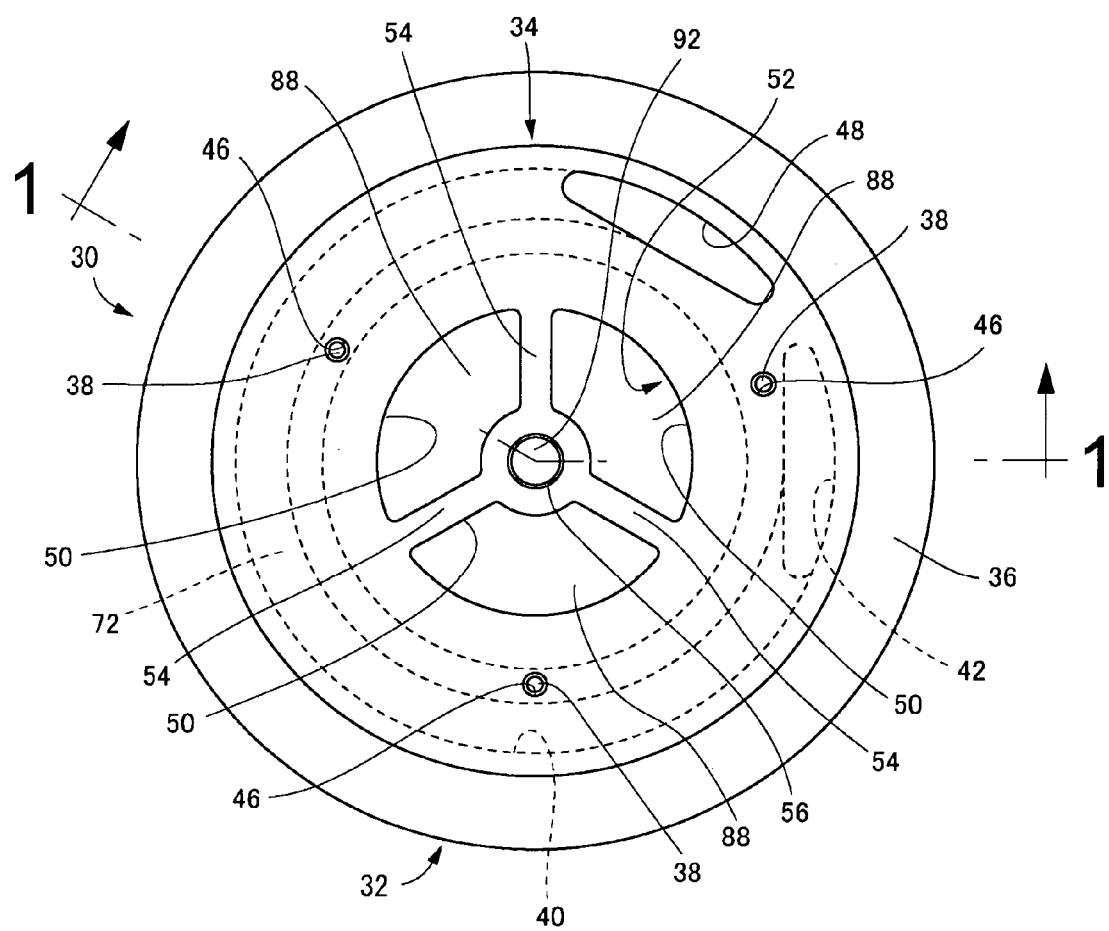
FIG. 2 is a top plane view of a partition member of the automotive engine mount of FIG. 1.

A partition member 30 is attached to the main rubber elastic body 16 integrally vulcanization molded component which incorporates the first and second mounting members 12, 14. As shown in FIG. 2, the partition member 30 includes a first partition fitting 32 and a second partition fitting 34. While in the present embodiment the partition member 30 is formed of metal material such as iron or aluminum alloy, it could also be formed from hard synthetic resin, for example.

The first partition fitting 32 has a large-diameter, generally annular shape. A collar portion 36 of annular plate shape projects in the diametrically outward direction from the lower outside peripheral edge of the first partition fitting 32. In a section lying towards the inside peripheral edge at the upper end of the first partition fitting 32, a plurality of upward projecting locking tongues 38 (there are three in the present embodiment) are spaced prescribed distances apart in the circumferential direction. Additionally, a circumferential groove 40 is formed in the axial medial section of the first partition fitting 32. The circumferential groove 40 extends continuously for a prescribed length in the circumferential direction (in the present embodiment, just short of once around the circumference) with a generally unchanging rectangular recessed cross section which opens onto the upper end face of the first partition fitting 32. At a first circumferential end of the circumferential groove 40 there is formed a communicating window 42 which passes in the axial direction through the bottom wall of the circumferential groove 40 and the lower end face of the first partition fitting 32.

The second partition fitting 34 on the other hand has a thin, generally circular disk shape, and its outside diameter dimension is approximately equal to the outside diameter dimension at the upper end portion of the first partition fitting 32. A center through-hole 44 of small-diameter circular shape passes through the center axis of the second partition fitting 34. Insertion holes 46 correspond in number to the locking tongues 38 of the first partition fitting 32 (there are three in the present embodiment) and are spaced prescribed distances apart in the circumferential direction. These insertion holes 46 pass through the diametrical medial section of the second partition fitting 34. Additionally, a communicating window 48 passes through the outside peripheral section of the second partition fitting 34 at a location overlapping the other circumferential end of the circumferential groove 40 in the first partition fitting 32 in the direction of juxtaposition of the first and second partition fittings 32, 34 (the vertical direction in FIG. 1).

Communicating holes 52 composed of a plurality of through-holes 50 (there are three in the present embodiment) are formed about the center through-hole 44 in the center section of the second partition fitting 34. The through-holes 50 are generally fan-shaped with gradually increasing width dimension in the circumferential direction going from the inner side towards the outer side in the diametrical direction; and the plurality of through-holes 50 are formed at equidistant intervals in the circumferential direction. In other words, the small-diameter ring-shaped diametrical inner section and the large-diameter ring-shaped diametrical outer section to either side of the communicating holes 52 in the second partition fitting 34 are connected by a plurality of linking plate portions 54 (there are three in the present embodiment) which are formed between neighboring through-holes 50 in the circumferential direction and extend with elongated rectangular shape in the diametrical direction.

In the present embodiment in particular, in a region to the inside peripheral side of the communicating holes 52 in the second partition fitting 34, a ring-shaped zone which does not extend as far as the inside peripheral edges of the communicating holes 52 from the center through-hole 44 is subjected to press working. Through this operation, in the annular zone which includes center through-hole 44 there is formed an annular shoulder portion 56 which projects out to one side in the thickness direction (the lower side in FIG. 1) beyond the diametrical medial and outside peripheral sections and the edges of the communicating holes 52 in the second partition fitting 34.

The outside peripheral section of the second partition fitting 34 is then juxtaposed against the upper end section of the first partition fitting 32 so that the first partition fitting 32 and the second partition fitting 34 are positioned approximately concentrically. The locking tongues 38 of the first partition fitting 32 are then inserted through the insertion holes 46 of the second partition fitting 34 thereby positioning the first partition fitting 32 and the second partition fitting 34 in the circumferential direction, and positioning the communicating window 48 of the second partition fitting 34 at the other circumferential end of the circumferential groove 40 of the first partition fitting 32. The partition member 30 composed of the first partition fitting 32 and the second partition fitting 34 is constituted thereby. The collar portion 36 of the partition member 30 is slipped from axially above into the caulking portion 24 of the second mounting member 14 and juxtaposed against the shoulder portion 22 of the second mounting member 14 about its entire circumference.

A diaphragm 58 serving as the flexible film is provided to the main rubber elastic body 16 integrally vulcanization molded component which incorporates the first mounting member 12 and the second mounting member 14. The diaphragm 58 is composed of a thin, readily deformable rubber film and has a distended upwardly convex, generally circular dome shape. A fastening member 60 is provided in the outside peripheral section of the diaphragm 58. The fastening member 60 has a large-diameter, generally round tubular shape with an inner flanged portion 62 integrally formed at its upper end and an outer flanged portion 64 integrally formed at its lower end. By vulcanization bonding the outside peripheral section of the diaphragm 58 to the inner flanged portion 62, the diaphragm 58 is formed as an integrally vulcanization molded component which incorporates the fastening member 60. A thin sealing rubber layer 66 which has been integrally formed with the diaphragm 58 covers the inside peripheral face of the fastening member 60.

The collar portion 36 of the partition member 30 and the outer flanged portion 64 of the fastening member 60 are both inserted from above into the caulking portion 24 of the second mounting member 14, juxtaposing the collar portion 36 against the shoulder portion 22 of the second mounting member 14 and juxtaposing the outer flanged portion 64 against the collar portion 36. The partition member 30 is then pressure fitted into the fastening member 60 via the sealing rubber layer 66 of the fastening member 60, and the upper end section at the outside peripheral side of the partition member 30 is juxtaposed against the inner flanged portion 62 of the fastening member 60 via the sealing rubber layer 66. The caulking portion 24 is then subjected to a swaging process to swage and fasten the collar portion 36 and the outer flanged portion 64 to the second mounting member 14. The partition member 30 and the diaphragm 58 will thereby fastened to the integrally vulcanization molded component of the main rubber elastic body 16 which incorporates the first and second mounting members 12, 14, and the upper opening of the second mounting member 14 will be blocked off fluidtightly by the partition member 30 and the diaphragm 58.

In the space between the axially opposed faces of the main rubber elastic body 16 and the diaphragm 58 to the inside of the second mounting member 14 and the fastening member 60, to a first side of the partition member 30 (the lower side in FIG. 1) there is formed a pressure receiving chamber 68 a portion of whose wall is defined by the main rubber elastic body 16 and which gives rise to pressure fluctuations based on elastic deformation of the main rubber elastic body 16. To the other side of the partition member 30 (the upper side in FIG. 1) there is formed an equilibrium chamber 70 a portion of whose wall is defined by the diaphragm 58 and which readily permits changes in volume based on elastic deformation of the diaphragm 58. The pressure receiving chamber 68 and the equilibrium chamber 70 are filled with a non-compressible fluid. Water, an alkylene glycol, a polyalkylene glycol, silicone oil, or the like may be favorably employed as the sealed fluid for example. However, in order to effectively achieve vibration damping action based on flow effects such as the resonance effect of the fluid, it will be especially preferable to use a low-viscosity fluid of 0.1 Pa·s or lower. Sealing of the non-compressible fluid within the pressure receiving chamber 68 and the equilibrium chamber 70 may be accomplished advantageously, for example, by assembling the partition member 30 and the diaphragm 58 together with the integrally vulcanization molded component of the main rubber elastic body 16 which incorporates the first and second mounting members 12, 14 while these components are submerged in the non-compressible fluid.

With the collar portion 36 of the partition member 30 and the outer flanged portion 64 of the fastening member 60 fastened by swaging to the caulking portion 24 of the second mounting member 14, and with the outside peripheral section of the second partition fitting 34 clamped axially between the inner flanged portion 62 of the fastening member 60 and the upper end section on the outside peripheral side of the first partition fitting 32, the second partition fitting 34 will be juxtaposed in intimate contact against the upper end section of the first partition fitting 32 and the opening of the circumferential groove 40 of the first partition fitting 32 will be blocked off fluidtightly by the second partition fitting 34. The lower end face of the second partition fitting 34 and the wall faces of the circumferential groove 40 thereby cooperate to define an orifice passage 72 which extends for a prescribed length in the circumferential direction (in the present embodiment, just short of once around the circumference) through the outside peripheral section of the partition member 30. A first end of the orifice passage 72 connects to the pressure receiving chamber 68 through the communicating window 42 which has been formed in the first partition fitting 32, while the other end of the orifice passage 72 connects to the equilibrium chamber 70 through the communicating window 48 which has been formed in the second partition fitting 34. The pressure receiving chamber 68 and the equilibrium chamber 70 thereby communicate with one another through the orifice passage 72, and flow of fluid between the two chambers 68, 70 will be permitted through the orifice passage 72.

The resonance frequency of fluid induced to flow through this orifice passage 72 will be tuned such that, for example, on the basis of the resonance effect of the fluid, effective vibration damping action (high attenuating action) will be produced against vibration in a low frequency range of around 10 Hz which corresponds to engine shake or the like. It is possible for tuning of the orifice passage 72 to be carried out, for example, through appropriate adjustment of the passage length and the passage cross sectional area of the orifice passage 72 with consideration to the spring rigidity of the walls of the pressure receiving chamber 68 and the equilibrium chamber 70, i.e. to characteristic values which are based on levels of elastic deformation of the main rubber elastic body 16 and of the diaphragm 58 which correspond to levels of pressure change necessary to induce a unit change in volume in the chambers 68, 70. Generally, the tuning frequency of the orifice passage 72 may be understood to be the frequency at which the phase of pressure fluctuations transmitted through the orifice passage 72 changes and a resonance state occurs.

Figure 3:
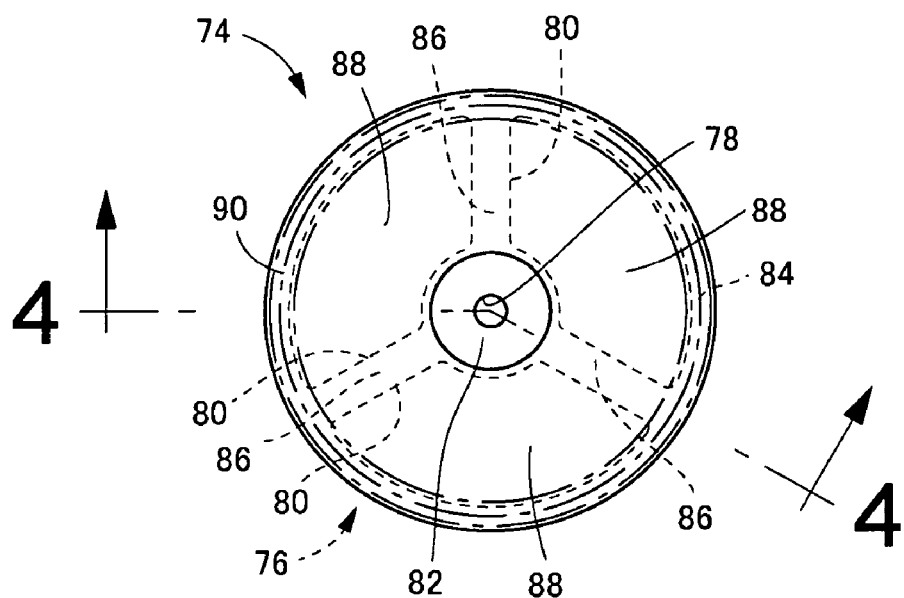
FIG. 3 is a top plane view of a movable cover member of the automotive engine mount of FIG. 1.
Figure 4:
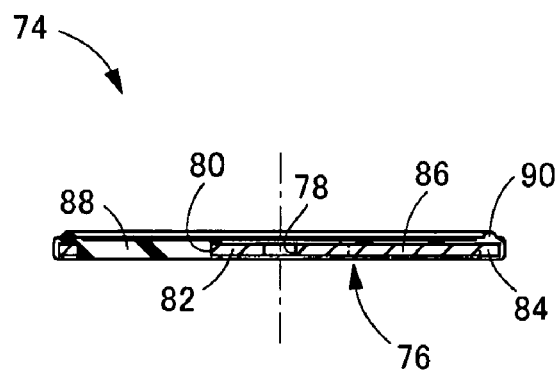
FIG. 4 is a cross sectional view taken along line 4-4 of FIG. 3.

Accordingly, a movable cover member 74 is provided in the center section of the partition member 30 in which the communicating holes 52 composed of the plurality of through-holes 50 have been formed. As shown in FIGS. 3 and 4, the movable cover member 74 has a generally circular disk shape overall, and is furnished with an elastic plate 76.

The elastic plate 76 has a thin, generally circular disk shape, and is form of a metal plate spring material. A small-diameter circular insertion hole 78 passes through the center axis of the elastic plate 76. A plurality of positioned windows 80 (there are three in the present embodiment) are formed in the diametrical medial section of the elastic plate 76 between the insertion hole 78 and the outside peripheral edge. The positioned windows 80 are generally fan-shaped with gradually increasing circumferential dimension going from the inside towards the outside in the diametrical direction; the outside peripheral edge and inside peripheral edge of each of the windows have large or small, generally arcuate shape while the two side edges lying in the circumferential direction extend approximately parallel to the radial direction of the elastic plate 76. The inside peripheral edges of the positioned windows 80 are situated diametrically outward from the insertion hole 78, while the outside peripheral edges of the positioned windows 80 are situated diametrically inward from the outside peripheral edge of the elastic plate 76. These three positioned windows 80 are formed at equal intervals in the circumferential direction of the elastic plate 76.

Specifically, in the elastic plate 76, the circular disk-shaped plate spring has been subjected to press working or the like to produce the insertion hole 78 and the positioned windows 80, thereby forming a shape resembling a wheel in plan view in which a boss-shaped section of small-diameter annular contours which includes the insertion hole 78 at the center, and a rim-shaped section of large-diameter annular contours spaced a prescribed distance away diametrically outward from the boss-shaped section, are connected to each other by a plurality of spoke-shaped portions. In the present embodiment, the boss-shaped section which includes the insertion hole 78 defines a fastening portion 82 of the movable cover member 74. The rim-shaped section defines an annular retainer portion 84 serving as the annular retainer member provided to the movable cover member 74. The spoke-shaped portions define elastic retainer portions 86 of the movable cover member 74. The elastic retainer portions 86 have elongated rectangular shape extending between the fastening portion 82 and the annular retainer portion 84 in the radial direction of the elastic plate 76. Three are formed at equal intervals in the circumferential direction. From the above it will be appreciated that the three elastic retainer portions 86, 86, 86 extend radially out from the fastening portion 82 at the center of the movable cover member 74, and the fastening portion 82 is elastically connected to the annular retainer portion 84 by the three elastic retainer portions 86, 86, 86.

Generally excluding the fastening portion 82 as a whole, a ring-shaped area of the elastic plate 76 is covered in its entirety by a thin elastic rubber material which has been formed so as to also cover the entire inside of each of the positioned windows 80. In other words, the elastic retainer portions 86 and the annular retainer portion 84 of the elastic plate 76 are anchored to the elastic rubber material by being embedded therein. By so doing, at the outside peripheral edge of the elastic plate 76 the annular retainer portion 84 will be embedded in the rubber material. Moreover, movable rubber films 88 are formed by generally fan-shaped planar sections of elastic rubber material which are anchored to the edges of the positioned windows 80. The movable rubber films 88 are thereby formed in regions to the inside peripheral side of the outside peripheral edge of the movable cover member 74, while the elastic plate 76 which incorporates the elastic retainer portions 86 is formed by a separate elastic material.

Furthermore, a sealing rib 90 which is integrally formed with the movable rubber films 88 is disposed at the outside peripheral edge of the movable cover member 74. The sealing rib 90 projects from the surface of the rubber layer which covers the upper face of the annular retainer portion 84, and extends continuously about the entire circumference in the circumferential direction with an upwardly convex chevron or semicircular cross section.

In short, the movable cover member 74 has a structure integrally incorporating the fastening portion 82, the elastic retainer portions 86, and the annular retainer portion 84 which are composed of spring material, as well as the movable rubber films 88 and the sealing rib 90 which are composed of rubber material. Moreover, the spring characteristic of the elastic plate 76 which includes the fastening portion 82, the elastic retainer portions 86, and the annular retainer portion 84 is greater than the spring characteristic of the movable rubber films 88; and the force which retains the fastening portion 82 and the annular retainer portion 84 in their relative positions in the axial direction is based primarily on the spring characteristic of the elastic retainer portions 86.

The movable cover member 74 having the above structure is juxtaposed in the axial direction against the center section of the second partition fitting 34 of the partition member 30 from the pressure receiving chamber 68 side (the lower side in FIG. 1); the fastening portion 82 of the movable cover member 74 is juxtaposed against the annular shoulder portion 56 of the second partition fitting 34; and the sealing rib 90 of the movable cover member 74 is juxtaposed about the outside peripheral edge of the communicating hole 52 of the second partition fitting 34. By aligning the movable cover member 74 and the second partition fitting 34 on the same center axis, the center through-hole 44 of the second partition fitting 34 and the insertion hole 78 of the fastening portion 82 will overlap one another in the direction of juxtaposition of the movable cover member 74 and the second partition fitting 34 (in FIG. 1, the direction of the axis of the mounting extending on the vertical). A blind rivet 92 is then inserted from the equilibrium chamber 70 side (the upper side in FIG. 1) into the center through-hole 44 and the insertion hole 78, is passed through the annular shoulder portion 56 and the fastening portion 82, and is then fastened through swaging with these portions juxtaposed in the axial direction. By so doing, only the fastening portion 82 in the movable cover member 74 is fastened at the center axis of the partition member 30; while the sealing rib 90 at the outside peripheral portion of the movable cover member 74 is juxtaposed along the entire circumference surrounding the communicating holes 52 of the second partition fitting 34 at their outside peripheral edge portions.

Figure 5A:
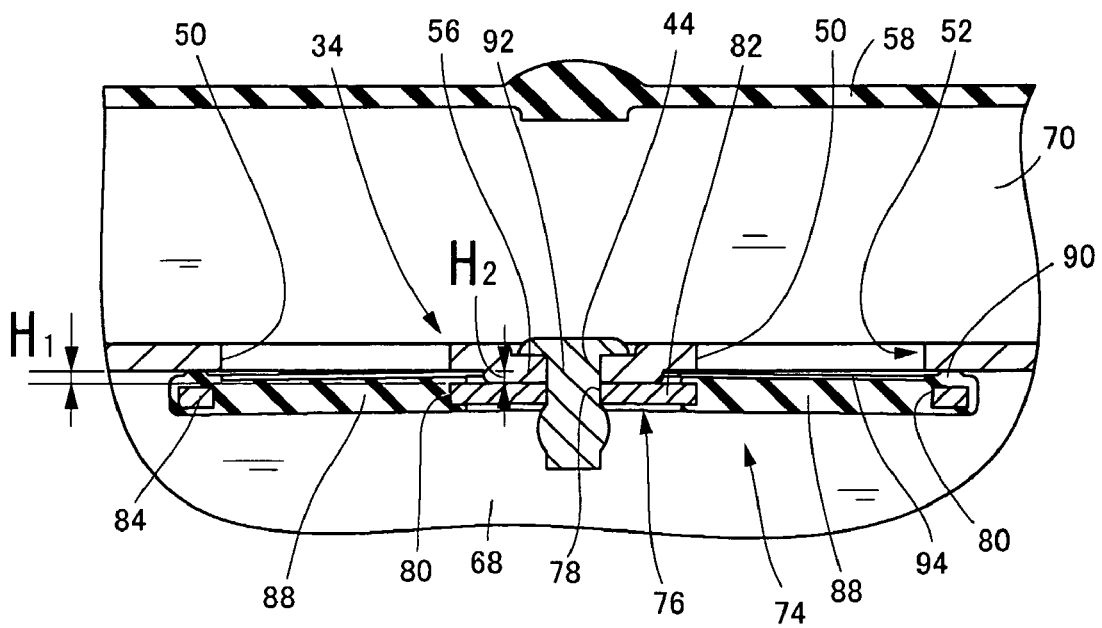
FIG. 5A is a fragmentally enlarged view in vertical cross section of the automotive engine mount of FIG. 1 in a state where an outside peripheral edge of the movable cover member is held in intimate contact against the partition member.

As depicted in FIG. 5A, the height dimension: $H_1$ in the axial direction between the heightwise location of the upper end face of the fastening portion 82 and the heightwise location projecting distal edge face of the sealing rib 90 in the movable cover member 74 is larger in comparison with the height dimension: $H_2$ in the axial direction between the heightwise location of the lower end face of the second partition fitting 34 in its outside peripheral section about the annular shoulder portion 56 and the heightwise location of the lower end face of the annular shoulder portion 56 (i.e. the projecting height of the annular shoulder portion 56 from the outside peripheral section of the second partition fitting 34). Accordingly, with the fastening portion 82 juxtaposed and fastened in the axial direction in intimate contact against the annular shoulder portion 56, force equivalent to displacement by $(H_1-H_2)$ will be exerted on the section of the movable cover member 74 situated diametrically outward from the fastening portion 82. Thus, the outside peripheral edge portion of the movable cover member 74, which has been juxtaposed in a free state against the partition member 30 without being fastened to it, will undergo displacement to a location below the fastening portion 82 at the center which has been fastened to the partition member 30, as a result of which the movable cover member 74 will undergo displacement with the center fastening portion 82 as the fastening point and become bent into a downward concave shape from the fastening point. In the present embodiment, the elastic recovery force of the movable cover member 74 displaced in this way as it attempts to recover its original flat shape will be based primarily on the spring characteristic of the elastic retainer portions 86. The elastic recovery force of the elastic retainer portions 86 will act as urging force tending to restore the outside peripheral edge portion of the movable cover member 74 to its original position in the axial direction. On the basis of this urging force, the sealing rib 90 which has been nipped between the second partition fitting 34 and the annular retainer portion 84 of the movable cover member 74 will experience compressive deformation in the axial direction, whereby the outside peripheral edge portion of the movable cover member 74 will be juxtaposed in intimate contact surrounding the outside peripheral edges of the communicating holes 52 of the second partition fitting 34 along the entire circumference. Additionally, positive pressure in the pressure receiving chamber 68 and negative pressure in the equilibrium chamber 70 will act on the movable cover member 74 causing the movable cover member 74 to undergo displacement closer towards the partition member 30, thereby producing a higher level of intimate contact between the partition member 30 and the outside peripheral edge portion of the movable cover member 74.

In the present embodiment in particular, the shape, size, and elasticity of the movable cover member 74 will be adjusted such that, with the center section of the movable cover member 74 (the fastening portion 82) fastened to the center section of the partition member 30 and the outside peripheral edge portion of the movable cover member 74 juxtaposed in intimate contact surrounding the communicating holes 52 of the partition member 30 through compressive deformation of the sealing rib 90, a gap 94 will form along the entire circumference in the axial direction between the movable cover member 74 and the equilibrium chamber 70 side-facing open faces of the communicating holes 52, with the presence of this gap 94 providing separation between the movable cover member 74 and the equilibrium chamber 70 side-facing open faces of the communicating holes 52.

Furthermore, with the movable cover member 74 assembled with the partition member 30, the linking plate portions 54 of the second partition fitting 34 and the elastic retainer portions 86 of the movable cover member 74, which portions have mutually corresponding rectangular flat shape, will be aligned in the circumferential direction; while the movable rubber films 88 and the through-holes 50 of the communicating holes 52 of the second partition fitting 34, which have mutually corresponding fan-shaped planar shape, will be aligned in the circumferential direction. Here, since the movable cover member 74 and the equilibrium chamber 70 side-facing open faces of the communicating holes 52 are spaced apart, the linking plate portions 54 and the elastic retainer portions 86 on the one hand, and the through-holes 50 and the movable rubber films 88 on the other, will be positioned respectively overlapping one another in projection view in the direction of juxtaposition of the movable rubber films 88 onto the open faces of the communicating holes 52.

In FIG. 5A the height dimension: $H_1$ in the axial direction from the upper end face of the fastening portion 82 to the projecting distal edge face of the sealing rib 90 in the movable cover member 74 is shown in a state in which the sealing rib 90 contacts the partition member 30 through compression deformation, and for this reason, $H_1$ is shown as being equal in size to the height dimension: $H_2$ in the axial direction from the lower end face of the second partition fitting 34 about the annular shoulder portion 56 of the second partition fitting 34 to the lower end face of the annular shoulder portion 56. In the present embodiment, $H_1 > H_2$ in the stage prior to assembly of the movable cover member 74 with the partition member 30. However, this is not limiting and it would be acceptable, for example, that $H_1 = H_2$ so that with the movable cover member attached the movable cover member will retain its approximate initial shape and will be disposed in contact against the partition member with substantially no compression deformation of the sealing rib. In this case as well, shape retention of the movable cover member will be based primarily on the spring characteristic of the elastic retainer portions. Moreover, it would be acceptable also for the elastic retainer portions to have contours which bow in the thickness direction so that with the movable cover member assembled together with the partition member, the elastic retainer portions will elastically deform and urging force will act on the outside peripheral portion of the movable cover member so as to juxtapose it in intimate contact against the partition member.

When the movable cover member 74 has been assembled with the partition member 30 in the manner described above, the pressure of the pressure receiving chamber 68 will act on a first face (the lower face in FIGS. 1 and 5A) of the movable rubber films 88 of the movable cover member 74, while the pressure of the equilibrium chamber 70 will act on the other face (the upper face in FIGS. 1 and 5A) of the movable rubber films 88 of the movable cover member 74 through the through-holes 50 which have been formed in the second partition fitting 34. Specifically, with the movable cover member 74 held in intimate contact with its outside peripheral edge portion surrounding the through-holes 50 of the second partition fitting 34, the movable rubber films 88 will experience elastic deformation based on pressure differentials between the pressure receiving chamber 68 and the equilibrium chamber 70 and pressure fluctuations of the pressure receiving chamber 68 will be absorbed thereby. The pressure fluctuation absorbing mechanism pertaining to the present embodiment includes the movable rubber films 88 and the through-holes 50 of the second partition fitting 34. In the present embodiment in particular, the characteristic frequency of the movable rubber films 88 has been tuned such that, during input of vibration in a medium frequency range on the order of 20 to 40 Hz which corresponds to idling vibration, low-speed rumble and the like, vibration damping action (vibration insulating action through a low dynamic spring characteristic) will be produced effectively on the basis of the pressure receiving chamber 68 pressure fluctuation absorbing action afforded by elastic deformation of the movable rubber films 88.

The spring characteristics of the elastic retainer portions 86 are established such that when pressure fluctuations are produced in the pressure receiving chamber 68 by vibration with amplitude of 1 mm or smaller, including engine shake, idling vibration, low-speed rumble and the like, the outside peripheral edge portion of the movable cover member 74 will be maintained in a state of contact against the partition member 30. With the pressure receiving chamber 68 in a pressurized state, the communicating holes 52 of the partition member 30 will thereby be covered fluidtightly by the movable cover member 74.

Meanwhile, the spring characteristic etc. of the elastic retainer portions 86 have also been established such that if input of jarring load with amplitude of more than 1 mm has resulted in an excessive level of negative pressure in the pressure receiving chamber 68 to the extent that cavitation bubbles form and a large relative pressure differential arises between the pressure receiving chamber 68 and the equilibrium chamber 70 acts on the movable cover member 74, the outside peripheral edge of the movable cover member 74 in at least a portion along its perimeter will undergo elastic deformation in the direction of separation from the partition member 30 (upward in FIGS. 1 and 5A), in opposition to the urging force of the elastic retainer portions 86 of the movable cover member 74.

With the automotive engine mount 10 constructed in the above way installed in an automobile, when vibration in a low frequency range such as engine shake which can become a problem during driving is input, relatively large pressure fluctuations will be produced in the pressure receiving chamber 68. Since this pressure is high, the pressure of the pressure receiving chamber 68 cannot be substantially absorbed by the movable rubber films 88, which have been tuned to very small amplitude. Moreover, the outside peripheral edge of the movable cover member 74 is held in intimate contact surrounding the communicating holes 52 of the second partition fitting 34. Consequently, shunting of the pressure receiving chamber 68 and the equilibrium chamber 70 between the juxtaposed faces of the movable cover member 74 and the second partition fitting 34 will be suppressed, a sufficient flow of fluid through the orifice passage 72 due to the relative pressure differential produced between the pressure receiving chamber 68 and the equilibrium chamber 70 will be effectively assured, and effective vibration damping (high attenuating action) of vibration in a low frequency range such as engine shake based on flow effects such as the resonance effect of fluid through the orifice passage 72 will be achieved.

On the other hand, input of vibration in a medium frequency range such as idling vibration which can be a problem with the vehicle at a stop, or low-speed rumble which can be a problem during driving, will give rise to small-amplitude pressure fluctuations in the pressure receiving chamber 68. Since the frequency range of this vibration is higher than the tuning frequency of the orifice passage 72, the orifice passage 72 will experience an appreciable rise in fluid flow resistance due to antiresonance effects and will become substantially blocked off. At this point, the pressure fluctuations of the pressure receiving chamber 68 will be absorbed on the basis of elastic deformation of the movable rubber films 88 which have been tuned to the medium frequency range in question, thereby avoiding development of very high dynamic spring due to the orifice passage 72 being substantially blocked off. For this reason, good vibration damping action (vibration insulating action based on a low dynamic spring characteristic) of vibration in the medium frequency range will be achieved.

Figure 5B:
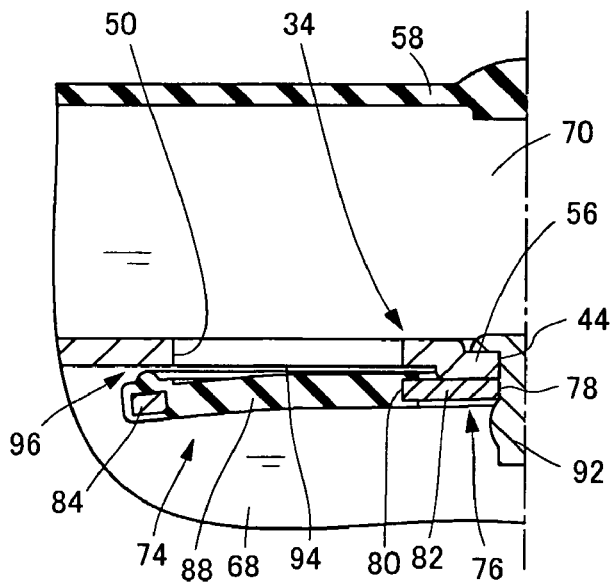
FIG. 5B is a fragmentally enlarged view in vertical cross section of the engine mount of FIG. 1 in a state where a shunt gap is formed between the movable cover member and the partition member.

Furthermore, when jarring load of 1 mm or greater in amplitude is input across the first mounting member 12 and the second mounting member 14 because the automobile rides up over a curb or drives over very bumpy roadway, the main rubber elastic body 16 will experience sudden and/or excessive elastic deformation, whereupon excessive negative pressure will develop in the pressure receiving chamber 68. When the relatively large pressure differential between the pressure receiving chamber 68 and the equilibrium chamber 70 acts on the movable cover member 74, the elastic retainer portions 86, the movable rubber films 88 and other possible portions of the movable cover member 74 will undergo elastic deformation towards the pressure receiving chamber 68 side. Also, as shown in FIG. 5B, at least a portion of the outside peripheral edge of the movable cover member 74 which had been in intimate contact against the partition member 30 will now undergo elastic deformation towards the pressure receiving chamber 68 side and thereby separate from the partition member 30 and be released from intimate contact with it, as well as forming a shunt gap 96, between the communicating holes 52 of the partition member 30 and that section of the movable cover member 74 which has separated from the partition member 30.

In association with the formation of this shunt gap 96, the pressure receiving chamber 68 and the equilibrium chamber 70 will now be placed in communication with each other through the communicating holes 52 and the shunt gap 96 thereby eliminating the excessive negative pressure condition in the pressure receiving chamber 68. As a result, cavitation bubbles which can cause noise problems may be advantageously suppressed. As will be apparent from the description above, the shunting mechanism by which the shunt gap 96 forms to prevent excessive negative pressure from arising in the pressure receiving chamber 68 is constituted by comprising the movable cover member 74, the second partition fitting 34, and the communicating holes 52 of the second partition fitting 34.

When the high level of negative pressure in the pressure receiving chamber 68 has been eliminated through formation of the shunt gap 96, the pressure differential acting on either side of the movable cover member 74 will become smaller. In particular, on the basis of the elastic recovery force of the elastic retainer portions 86 and the annular retainer portion 84 which had deformed towards the pressure receiving chamber 68 side, the movable cover member 74 will now recover to its condition prior to deforming towards the pressure receiving chamber 68 side, whereupon the shunt gap 96 will disappear and the outside peripheral edge of the movable cover member 74 will again be maintained in intimate contact against the partition member 30, with the sealing rib 90 of the movable cover member 74 undergoing compressive deformation.

Consequently, in the automotive engine mount 10 of structure according to the present embodiment, the shunting mechanism for the pressure receiving chamber 68 and the equilibrium chamber 70 is integrally formed with the movable rubber films 88 which constitute part of the pressure fluctuation absorbing mechanism of the pressure receiving chamber 68 in the movable cover member 74, thereby avoiding an increase in the number of assembly steps that would be associated with forming the shunting mechanism separately from the movable cover member 74 and installing it in the partition member 30, as well as advantageously affording improved production efficiency.

Moreover, by overlapping the insertion hole 78 of the movable cover member 74 and the center through-hole 44 of the partition member 30 in the axial direction, and then passing the blind rivet 92 through the two holes 44, 78 and swaging the components, the movable cover member 74 and the partition member 30 will be positioned coaxially at the same time that the pressure fluctuation absorbing mechanism and the shunting mechanism are disposed on the partition member 30. With this arrangement, the structures for attaching the pressure fluctuation absorbing mechanism and the shunting mechanism to the partition member 30 may be simplified, and the freedom in design of the movable rubber films 88 and the annular retainer portion 84, as well as of the orifice passage 72 formed in the partition member 30, may be advantageously improved.

Additionally, since the shunt gap 96 is produced through separation of the outside peripheral edge of the movable cover member 74 away from the partition member 30, a large area for formation of the shunt gap 96 will be assured at the perimeter of the movable cover member 74, and the shunt gap 96 will have a simple structure.

Moreover, in the present embodiment, the orifice passage 72 is formed so as to extend in the circumferential direction through the outside peripheral section of the partition member 30, and the communicating holes 52 are formed in the center section of the partition member 30. Sufficient passage length of the orifice passage 72 may be assured thereby, improving freedom in tuning of the vibration damping action based on flow effects of fluid through the orifice passage 72. Since the movable rubber films 88 and the shunt gap 96 are disposed towards the center of the partition member 30, it will be a simple matter through deformation of the movable rubber films 88 to handle any localized pressure differentials arising between the pressure receiving chamber 68 and the equilibrium chamber 70, whereby fluid pressure absorbing action by the pressure receiving chamber 68 and pressure equilibrium between the pressure receiving chamber 68 and the equilibrium chamber 70 may be more consistently achieved.

Furthermore, in the present embodiment, the fastening portion 82, the elastic retainer portions 86, and the annular retainer portion 84 can be manufactured readily owing to being integrally formed with the elastic plate 76. Moreover, due to the fact that the movable rubber films 88 are formed through vulcanization bonding of rubber material to the positioned windows 80 of the elastic plate 76, the spring characteristic of the elastic plate 76 and the spring characteristic of the movable rubber films 88 can be tuned independently. Thus, the movable rubber films 88 may be endowed with optimal spring characteristics providing desired vibration damping action through liquid pressure absorption, while the elastic plate 76 may be endowed with spring characteristics consistently affording urging force acting on the outside peripheral edge of the movable cover member 74.

In the present embodiment, furthermore, the movable cover member 74 has a circular disk shape with the fastening portion 82 for fastening to the partition member 30 formed in the center section of the movable cover member 74, and the plurality of elastic retainer portions 86 extend out radially towards the outside peripheral edge from the fastening portion 82. Thus, the urging force of the elastic retainer portions 86 may be directed efficiently on the outside peripheral edge of the movable cover member 74, and space for placement of the movable rubber films 88 between the plurality of elastic retainer portions 86 in the circumferential direction will be effectively ensured.

Moreover, in the present embodiment, by providing the gap 94 along the entire circumference between the opposed faces of the movable rubber films 88 in the movable cover member 74 and the equilibrium chamber 70 side-facing open faces in the communicating holes 52 of the partition member 30, contact of the movable rubber films 88 against the edges of the communicating holes 52 of the partition member 30 can be avoided. The durability of the movable rubber films 88 can be advantageously improved thereby, and a large area for deformation of the movable rubber films 88 can be assured, thereby affording further improvement of freedom in tuning of the pressure absorbing action.

Furthermore, in the present embodiment, the movable cover member 74 is provided at its outside peripheral edge with a sealing rib 90 which extends continuously about the entire circumference on the face thereof which is intended to be juxtaposed surrounding the communicating holes 52 of the partition member 30; and the sealing rib 90 undergoes compressive deformation into intimate contact surrounding the communicating holes 52. Sealing capability between the juxtaposed faces of the movable cover member 74 and the partition member 30 may be improved thereby, and pressure leakage from the pressure receiving chamber 68 between the juxtaposed faces may be prevented more advantageously. Moreover, once the outside peripheral edge of the movable cover member 74 has separated from the partition member 30 to release the outside peripheral edge and the partition member 30 from intimate contact and thereby dispel the marked pressure differential between the pressure receiving chamber 68 and the equilibrium chamber 70 through the resultant shunt gap 96, when the movable cover member 74 subsequently returns to its original condition of intimate contact under the urging force of the elastic retainer portions 86, the outside peripheral edge of the movable cover member 74 will come into contact against the partition member 30 via the sealing rib 90, whereby the cushioning action of sealing rib 90 will prevent striking noise, as well as advantageously assuring durability.

Furthermore, in the present embodiment, the hard annular retainer portion 84 is embedded in the outside peripheral edge portion of the movable cover member 74, whereby the rigidity of the annular retainer portion 84 may be utilized to further stabilize intimate contact of the outside peripheral edge portion of the movable cover member 74 against the partition member 30. Moreover, since the annular retainer portion 84 is formed by a plate spring, it is a simple matter to adjust the extent of deformation at the outside peripheral edge of the movable cover member 74. Thus, for example with the movable cover member 74 in intimate contact against the partition member 30, deformation of the outside peripheral edge portion can be induced so as to provide an even higher level of urging force by the elastic retainer portions 86. Alternatively, deformation of the outside peripheral edge portion can be induced so that the shunt gap 96 will form rapidly upon release from intimate contact.

Additionally, in the present embodiment, the through-holes 50 of the communicating holes 52 and the movable rubber films 88 which have mutually corresponding, generally fan-shaped planar contours are aligned in the circumferential direction and overlapping one another in projection view in the direction of juxtaposition of the movable rubber films 88 onto the open faces of the communicating holes 52. The pressure of the equilibrium chamber 70 will thereby be directed efficiently onto the movable rubber films 88 through the communicating holes 52 to assure sufficient levels of deformation of the movable rubber films 88, whereby further improvement of the objective liquid pressure absorbing action may be achieved.

Further, in the present embodiment, the fastening portion 82 for fastening to the partition member 30 is disposed in the center section of the movable cover member 74, and the outside peripheral edge of the movable cover member 74 is positioned in intimate contact against it surrounding the communicating holes 52 of the partition member 30. Thus, when assembling the movable cover member 74 with the partition member 30 it will be a simple matter to position the movable cover member 74 with respect to the communicating holes 52 of the partition member 30, without the inconvenience of having to take care to prevent mispositioning in the axis-perpendicular direction.

For this reason, with the automotive engine mount 10 which pertains to the present embodiment, in addition to advantages such as improved production efficiency, lower cost, and more compact size, by virtue of more consistent pressure fluctuation absorbing action and shunting action it will be possible to advantageously achieve the objective vibration damping effect on the basis of fluid flow effects through the orifice passage 72, as well as reduced noise and vibration at times of input of jarring load.

Figure 6:
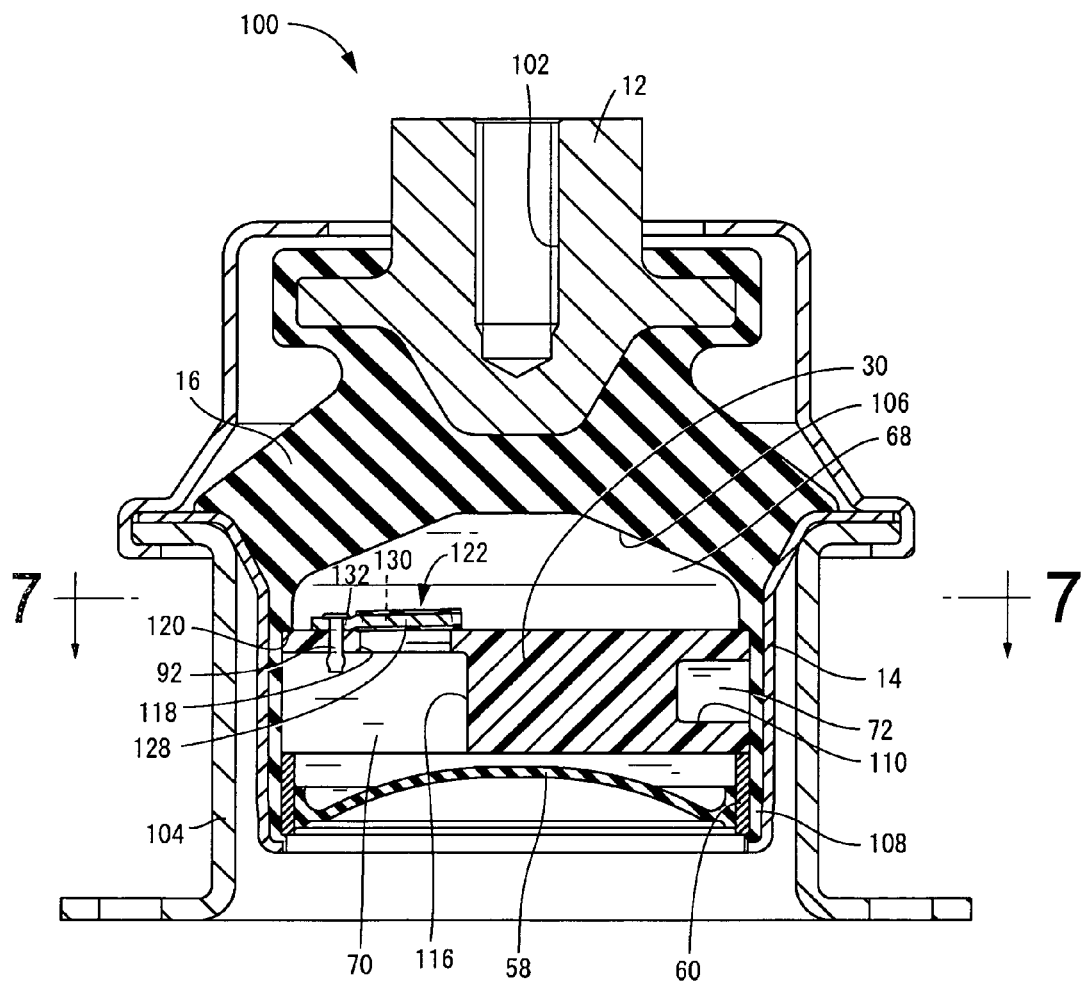
FIG. 6 is an elevational view in axial or vertical cross section of an automotive engine mount of construction according to a second embodiment of the invention, taken along line 6-6 of FIG. 7.
Figure 7:
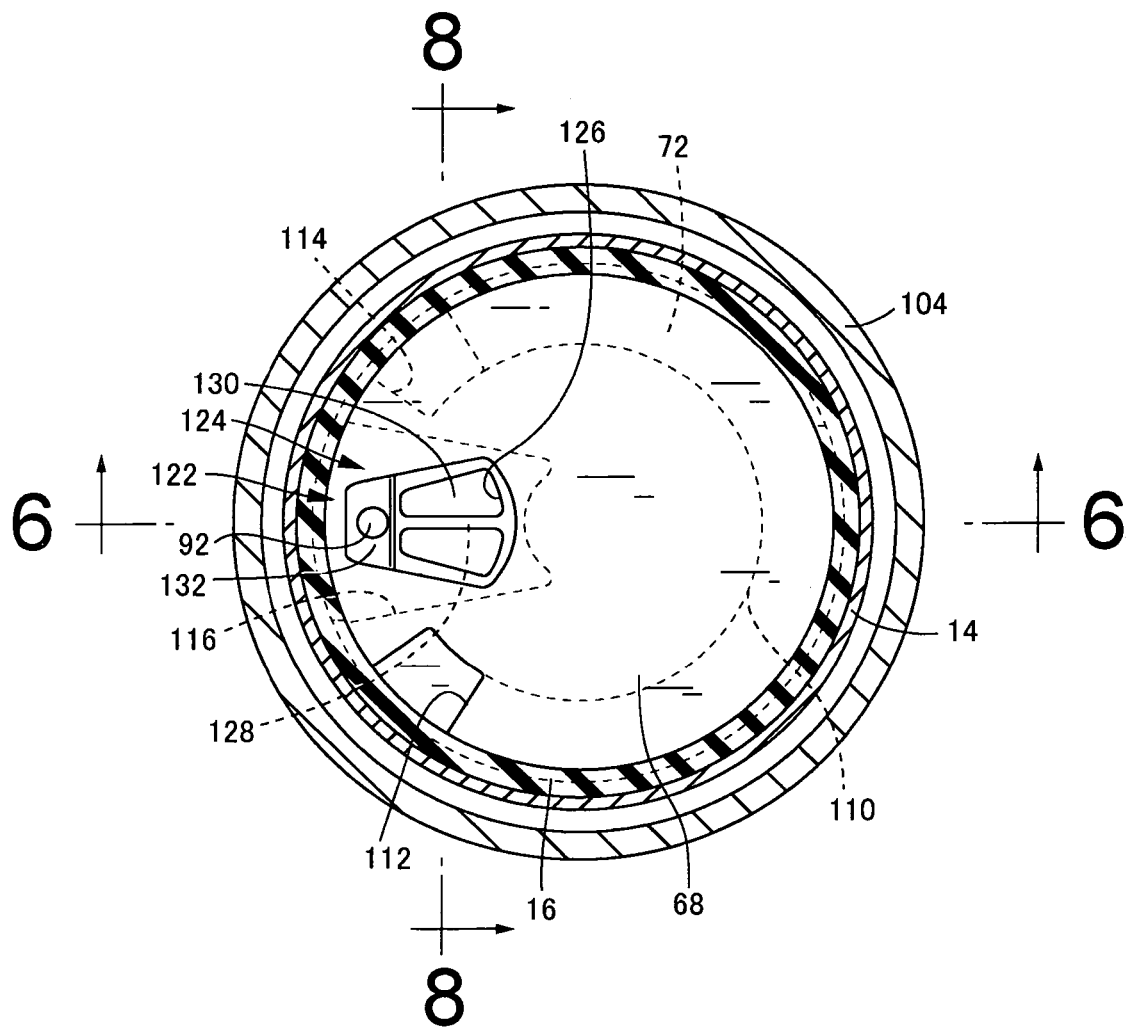
FIG. 7 is a cross sectional view taken along line 7-7 of FIG. 6.

Next, FIGS. 6 and 7 illustrate an automotive engine mount 100 as a second embodiment pertaining to the fluid filled type vibration damping device of the present invention. In the description below, components and parts which are substantially identical in structure to those of the first embodiment will be assigned the same symbols in the drawings and will not be discussed in any detail.

Turning now to a more detailed description, the first mounting member 12 pertaining to the present embodiment has a generally round cylindrical shape or a truncated frusto-conical shape, and in its center section is provided with a screw hole 102 intended to be screw fastened onto a mounting member on the power unit, not shown.

The first mounting member 12 is positioned spaced apart by a prescribed distance in the axial direction from the opening at a first axial end (the upper end in FIG. 6) of a second mounting member 14 of large-diameter, round tubular shape, with the center axis of the first mounting member 12 and the center axis of the second mounting member 14 positioned on generally the same line. A large-diameter round tubular bracket fitting 104 is slipped about the exterior of the second mounting member 14 and fastened by swaging in the upper part of the second mounting member 14. This bracket fitting 104 is fastened to a mounting member on the body side using fastening bolts, not shown, thereby mounting the second mounting member 14 onto the vehicle body via the bracket fitting 104.

A main rubber elastic body 16 which is positioned between the first mounting member 12 and the second mounting member 14 has a large-diameter, generally frustoconical shape. To the small diameter end of the main rubber elastic body 16 the first mounting member 12 is vulcanization bonded with a region extending from its axial medial section to the lower end embedded therein; while the outside peripheral face of the large-diameter end of the main rubber elastic body 16 is vulcanization bonded to the inside peripheral face of the second mounting member 14 from its upper part to its axial medial section.

A large-diameter recess 106 of inverted bowl shape which opens downward is formed on the large-diameter end face of the main rubber elastic body 16. A thin sealing rubber layer 108 integrally formed with the main rubber elastic body 16 covers the inside peripheral face of the second mounting member 14 from its axial medial section to the lower end.

A partition member 30 provided to the second mounting member 14 has a thick, generally circular disk shape and is fabricated from hard synthetic resin material, metal material, or the like. A circumferential groove 110 is formed in the axial medial section of the partition member 30, and extends in the circumferential direction for a length just short of once around the circumference, with a generally rectangular slot-shaped cross section which opens onto the peripheral wall face of the partition member 30. A communicating window 112 which opens onto the upper end face of the partition member 30 is formed at a first circumferential end of the circumferential groove 110, while a communicating window 114 which opens onto the lower end face of the partition member 30 is formed at the other circumferential end of the circumferential groove 110.

Additionally, an intercommunicating recess 116 is formed between the circumferential ends of the circumferential groove 110 in the outside peripheral section of the partition member 30. The intercommunicating recess 116 extends down from the vicinity of the upper end of the partition member 30 and opens onto the lower face of the partition member 30. The region situated at the bottom portion of the intercommunicating recess 116 in the partition member 30 thereby has a thin planar shape, and a communicating hole 118 which passes through the upper face of the partition member 30 and the bottom face of the intercommunicating recess 116 is formed in this region. The communicating hole 118 is generally rectangular or fan-shaped.

The fastening member 60 having generally round tubular shape is vulcanization bonded about the entire circumferential of its inside peripheral face to the outside peripheral edge portion (face) of a diaphragm 58 which is provided to the second mounting member 14.

The partition member 30 and the fastening member 60 of the diaphragm 58 are inserted in the axial direction into the second mounting member 14 from its other axial end (the lower end in FIG. 6), and the outside peripheral section of the upper end of the partition member 30 is juxtaposed against a shoulder portion 120 defined by the main rubber elastic body 16 which extends diametrically inward from the inside peripheral face of the second mounting member 14, while the upper end section of the fastening member 60 is juxtaposed against the outside peripheral section of the lower end of the partition member 30. The second mounting member 14 is then subjected to a diameter reducing process such as 360 degree radial compression or drawing using a die divided into eight circumferential parts, whereby the partition member 30 and the diaphragm 58 are juxtaposed in intimate contact in the axis-perpendicular direction against the second mounting member 14 via the sealing rubber layer 108, and are supported firmly by the second mounting member 14.

A pressure receiving chamber 68 is thereby formed to a first side of the partition member 30 (the upper side in FIG. 6), while an equilibrium chamber 70 is formed to the other side of the partition member 30 (the lower side in FIG. 6). Also, the circumferential groove 110 of the partition member 30 is covered fluidtightly by the second mounting member 14 to form an orifice passage 72. A first end of the orifice passage 72 connects to the pressure receiving chamber 68 through a communicating window 112 which has been formed in the upper end part of the partition member 30, while the other end of the orifice passage 72 connects to the equilibrium chamber 70 through a communicating window 114 which has been formed in the lower end part of the partition member 30. In the present embodiment in particular, the intercommunicating recess 116 of the partition member 30 opens onto the lower end face (portion) which defines part of the wall of the equilibrium chamber 70, whereby the equilibrium chamber 70 includes the interior of the intercommunicating recess 116 of the partition member 30.

A movable cover member 122 is provided to the partition member 30. The movable cover member 122 includes an elastic plate 124. The elastic plate 124 is formed by a plate spring which has a generally fan-shaped or rectangular planar shape, and is perforated in its thickness direction (the vertical in FIG. 6) by a positioned window 126 which is eccentric towards one side in the width direction (the left side in FIG. 7). This positioned window 126 is of fan or rectangular shape slightly smaller than the shape of the elastic plate 124 and is approximately equal in size to the communicating hole 118 which has been formed in the partition member 30. That is, the elastic plate 124 has a larger shape than the communicating hole 118 of the partition member 30.

Figure 8:
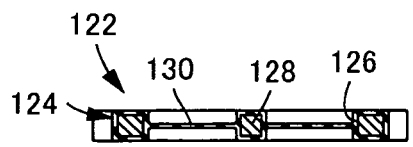
FIG. 8 is an enlarged view in vertical cross section of a movable cover member of the automotive engine mount of FIG. 6, taken along line 8-8 of FIG. 7.

As shown in FIG. 8, an elastic retainer portion 128 of generally elongated rectangular shape is integrally formed in the medial section of the positioned window 126 of the elastic plate 124, with the two ends of the elastic retainer portion 128 integrally linked to the edges at the two sides of the positioned window 126 in its width direction. The positioned window 126 and the elastic retainer portion 128 may be integrally formed by press working of the elastic plate 124, for example.

A movable rubber film 130 is anchored to the movable cover member 122 so as to cover the entirety of the positioned window 126 of the elastic plate 124. The movable rubber film 130 is formed by a thin, readily deformable rubber film vulcanization bonded at its outside peripheral edge along the entire edge of the positioned window 126, and is anchored in such a way as to fill the inside of the positioned window 126. The movable rubber film 130 thereby has an outer shape approximately identical to the positioned window 126 and a shape larger than the communicating hole 118 of the partition member 30, with the elastic retainer portion 128 formed to the inside of the positioned window 126 being anchored to the movable rubber film 130 by being embedded therein.

The movable cover member 122 which has been integrally provided with the elastic plate 124 and the movable rubber film 130 is juxtaposed surrounding the communicating hole 118 of the partition member 30 from the pressure receiving chamber 68 side. The movable rubber film 130 is juxtaposed so as to cover the entire open face of the communicating hole 118 on the pressure receiving chamber 68 side.

In the elastic plate 124 of the movable cover member 122, an area to the other side in the width direction opposite from the movable rubber film 130 (the left side in FIG. 7) constitutes a fastening portion 132 for fastening to the partition member 30. The fastening portion 132 is juxtaposed onto a tabular section surrounding the communicating hole 118 which is situated in the bottom portion of the intercommunicating recess 116 of the partition member 30. A blind rivet 92 is then passed through a hole which perforates the fastening portion 132 and the tabular section of the partition member 30, and is fastened there by swaging, whereby the movable cover member 122 is fastened to the partition member 30 exclusively via the fastening portion 132 which is situated eccentrically towards the outside peripheral side from the center section. By disposing the movable cover member 122 to the outside peripheral side of the partition member 30, it is positioned at a location away from the center axis of the engine mount 100.

The rubber layer of the outside peripheral edge portion of the movable rubber film 130 which has been disposed covering the edge portion of the positioned window 126 projects out in the thickness direction beyond the fastening portion 132 of the elastic plate 124. Thus, with the fastening portion 132 and the partition member 30 juxtaposed in intimate contact using the blind rivet 92, and with the rubber layer juxtaposed surrounding the communicating hole 118 of the partition member 30, the elastic retainer portion 128 side of the movable cover member 122 will experience elastic deformation so as to incline upward. Primarily on the basis of the elastic recovery force of the elastic retainer portion 128, the outside peripheral edge portion of the movable cover member 122 situated in the outside peripheral region of the movable rubber film 130 will produce urging force which pushes the rubber layer around the communicating hole 118 of the partition member 30.

The outside peripheral edge portion of the movable cover member 122 will be juxtaposed thereby in intimate contact surrounding the communicating hole 118 of the partition member 30. Additionally, the pressure of the pressure receiving chamber 68 acts on a first face (the upper face in FIG. 6) of the movable rubber film 130 in the movable cover member 122 while the pressure of the equilibrium chamber 70, through the communicating hole 118, acts on the other face (the lower face in FIG. 6) of the movable rubber film 130. The movable cover member 122 in a state of intimate contact the movable rubber film 130 will undergo elastic deformation based on the relative pressure differential between the pressure receiving chamber 68 and the equilibrium chamber 70, thereby constituting the pressure fluctuation absorbing mechanism for absorbing pressure fluctuations of the pressure receiving chamber 68.

In the present embodiment, as in the first embodiment described previously, the spring characteristics, etc. of the elastic retainer portion 128 are established such that when pressure fluctuations have been produced in the pressure receiving chamber 68 due to vibration of amplitude of 1 mm or less, including engine shake, idling vibration, or low speed rumble, etc. for example, the outside peripheral edge portion of the movable cover member 122 will be maintained in contact against the partition member 30. By so doing, with the pressure receiving chamber 68 in a pressurized state the communicating hole 118 of the partition member 30 will be covered fluidtightly by the movable cover member 122.

The spring characteristics, etc. of the elastic retainer portion 128 are furthermore established such that when, on the other hand, jarring load of amplitude of 1 mm or greater is input across the first mounting member 12 and the second mounting member 14 resulting in a state of excessive negative pressure of an extent sufficient for cavitation bubbles to form in the pressure receiving chamber 68 so that a relatively large pressure differential between the pressure receiving chamber 68 and the equilibrium chamber 70 acts on the movable cover member 122, at this point at least a portion of the outside peripheral edge portion of the movable cover member 122 along its circumference will undergo elastic deformation in the direction of separation from the partition member 30 (upward in FIG. 6) in opposition to the urging force of the elastic retainer portion 128 of the movable cover member 122. Consequently, when jarring load is input, at least a portion of the outside peripheral edge portion of the movable cover member 122 which was in intimate contact against the partition member 30 will now undergo elastic deformation toward the pressure receiving chamber 68 side, to thereby separate from the partition member 30 and become released from intimate contact therewith. A shunt gap, not shown, will form between the section of the movable cover member 122 which has separated from the partition member 30, and the communicating hole 118 of the partition member 30, like in the first embodiment.

In association with formation of the shunt gap 96, the pressure receiving chamber 68 and the equilibrium chamber 70 will be placed in communication with each other through the shunt gap 96 thereby dispelling the state of excessive negative pressure in the pressure receiving chamber 68. As a result, cavitation bubbles which may cause a noise problem will be suppressed effectively. The shunting mechanism in the present embodiment includes the movable cover member 122, the partition member 30, and the communicating hole 118 of the partition member 30.

Accordingly, in the automotive engine mount 100 of structure according to the present embodiment, the pressure fluctuation absorbing mechanism and the shunting mechanism are integrally provided in the movable cover member 122, thus, as in the preceding first embodiment affording advantages such as improved production efficiency, lower cost, and more compact size. Additionally, by virtue of more consistent pressure fluctuation absorbing action and shunting action, it is possible to advantageously achieve the objective vibration damping effect on the basis of fluid flow effects through the orifice passage 72, as well as reduced noise and vibration at times of input of jarring load.

In the present embodiment in particular, the fastening portion 132 of the movable cover member 122 for fastening to the partition member 30 is disposed to the outside peripheral side of the movable cover member 122 so that a large length dimension may be assured for the elastic retainer portion 128 of the movable cover member 122. For this reason the freedom in design of the elastic retainer portion 128 may be increased, and the freedom in tuning of urging force acting on the outside peripheral edge portion of the movable cover member 122 may be improved as well.

While the present invention has been described in detail in its presently preferred embodiment, for illustrative purpose only, it is to be understood that the invention is by no means limited to the details of the illustrated embodiment, but may be otherwise embodied. It is also to be understood that the present invention may be embodied with various changes, modifications and improvements which may occur to those skilled in the art, without departing from the spirit and scope of the invention.

For example, the shape, size, structure, placement, and number of the partition member, the fastening portion and the elastic retainer portion of the movable cover member, the movable rubber film and other components are not limited to those taught herein by way of example, and may be established appropriately according to the required vibration damping capability, ease of manufacture, or other considerations.

Figure 9:
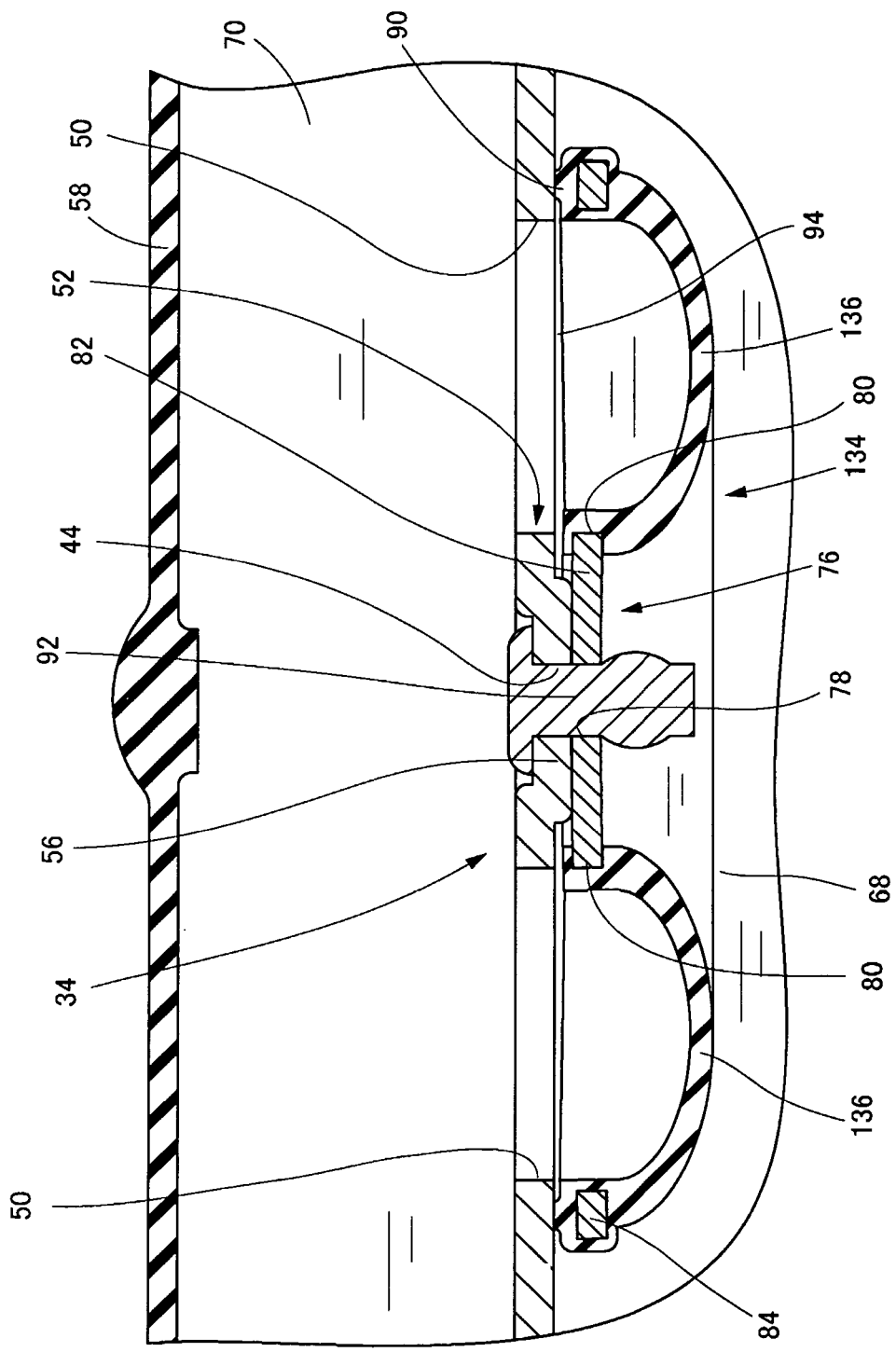
FIG. 9 is a fragmentally enlarged view in vertical cross section of an automotive engine mount of construction according to another embodiment.

Specifically, whereas in the preceding embodiments the movable cover member 74, 122 is entirely flat, as depicted in FIG. 9 for example, in a movable cover member 134 furnished with an elastic plate 76 of flat shape, movable rubber films 136 which are anchored to the positioned windows 80 could be given bowed shapes which distend convexly towards the pressure receiving chamber 68 side from the edges of the positioned windows 80, so that the movable cover member 134 is partially bowed.

Figure 10:
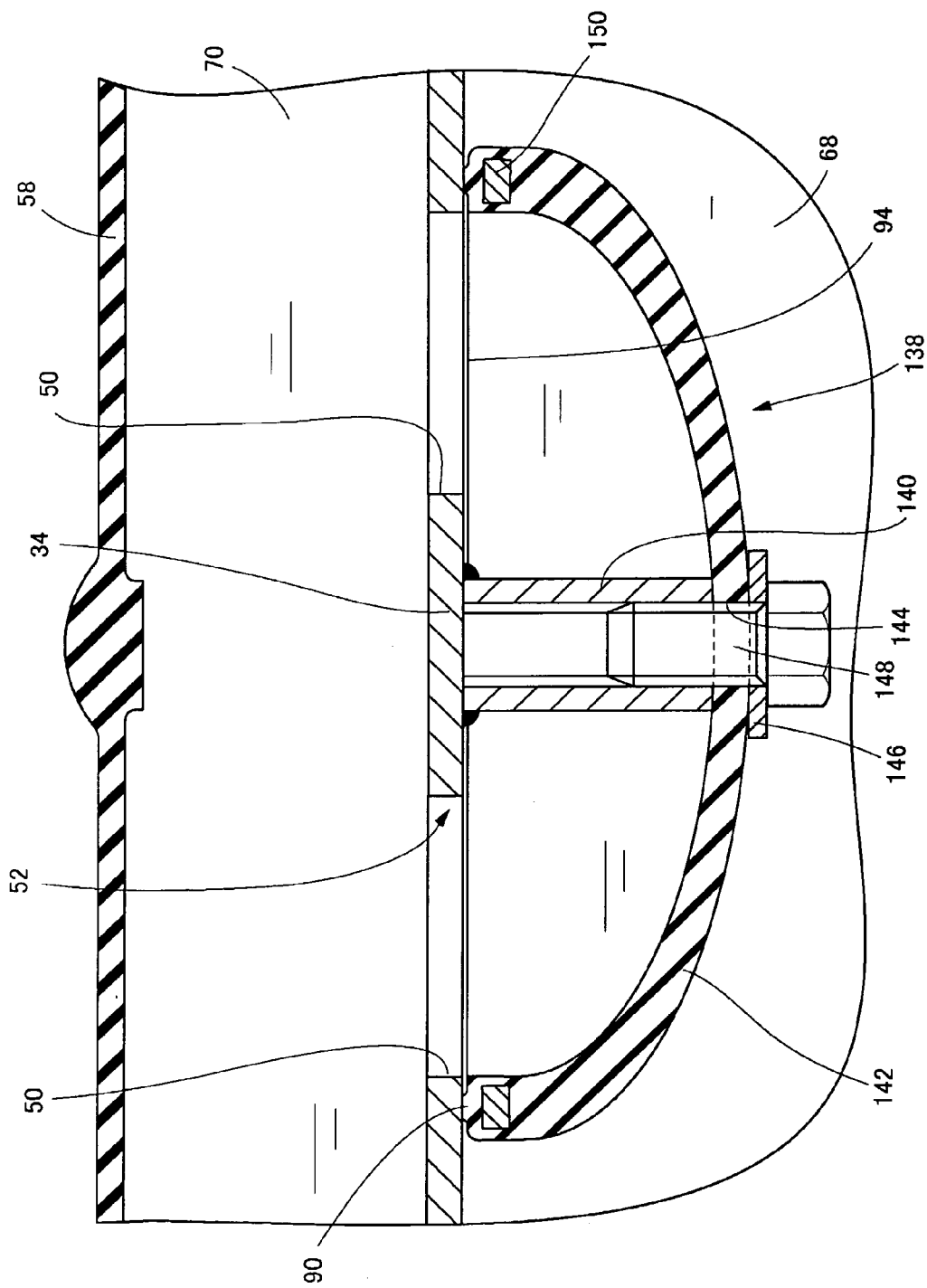
FIG. 10 is a fragmentally enlarged view in vertical cross section of an automotive engine mount of construction according to yet another embodiment.

In another possible arrangement depicted in FIG. 10 for example, the fastening portion 140 for fastening the movable cover member 138 to the partition member 30 is constituted as a tubular fitting having a screw thread on its inside peripheral face and is fastened so as to project out towards the pressure receiving chamber 68 side from the lower end face of the center section of the second partition fitting 34; the movable cover member 138 is furnished with a movable rubber film 142 which has bowing shape distended convexly towards the pressure receiving chamber 68 side, with a through-hole 144 formed in the center section of the movable rubber film 142; and with the inside face surrounding the through-hole 144 on the equilibrium chamber 70 side juxtaposed against the projecting distal end face of the fastening portion 140, a fastening bolt 148 is passed through the through-hole 144 with an intervening spacer 146 from the outside face side surrounding the through-hole 144 and threaded into to the fastening portion 140, while the outside peripheral edge portion of the movable rubber film 142 is disposed in intimate contact against a sealing rib 90 so as to surround the communicating hole 52 of the second partition fitting 34, whereby the movable cover member 138 has a bowing shape which distends convexly as a whole towards the pressure receiving chamber 68 side.

Moreover, as shown in FIG. 10, as the movable cover member 138 is not necessary to employ the elastic plate pertaining to the preceding embodiments; and the elastic retainer portions 86 of the elastic plate 76 used in the first embodiment for example could be replaced by elastic retainer portions defined by portions of the movable rubber film 142 and having varying thickness dimension, shape, and size on the circumference of the movable rubber film 142.

Furthermore, as shown in FIG. 10, in place of the annular retainer portion 84 of the elastic plate 76 employed in the first embodiment there instead be employed an annular retainer portion 150 composed of a ring-shaped plate spring for example, with the annular retainer portion 150 being anchored embedded in the outside peripheral portion the movable rubber film 142.

Figure 11:
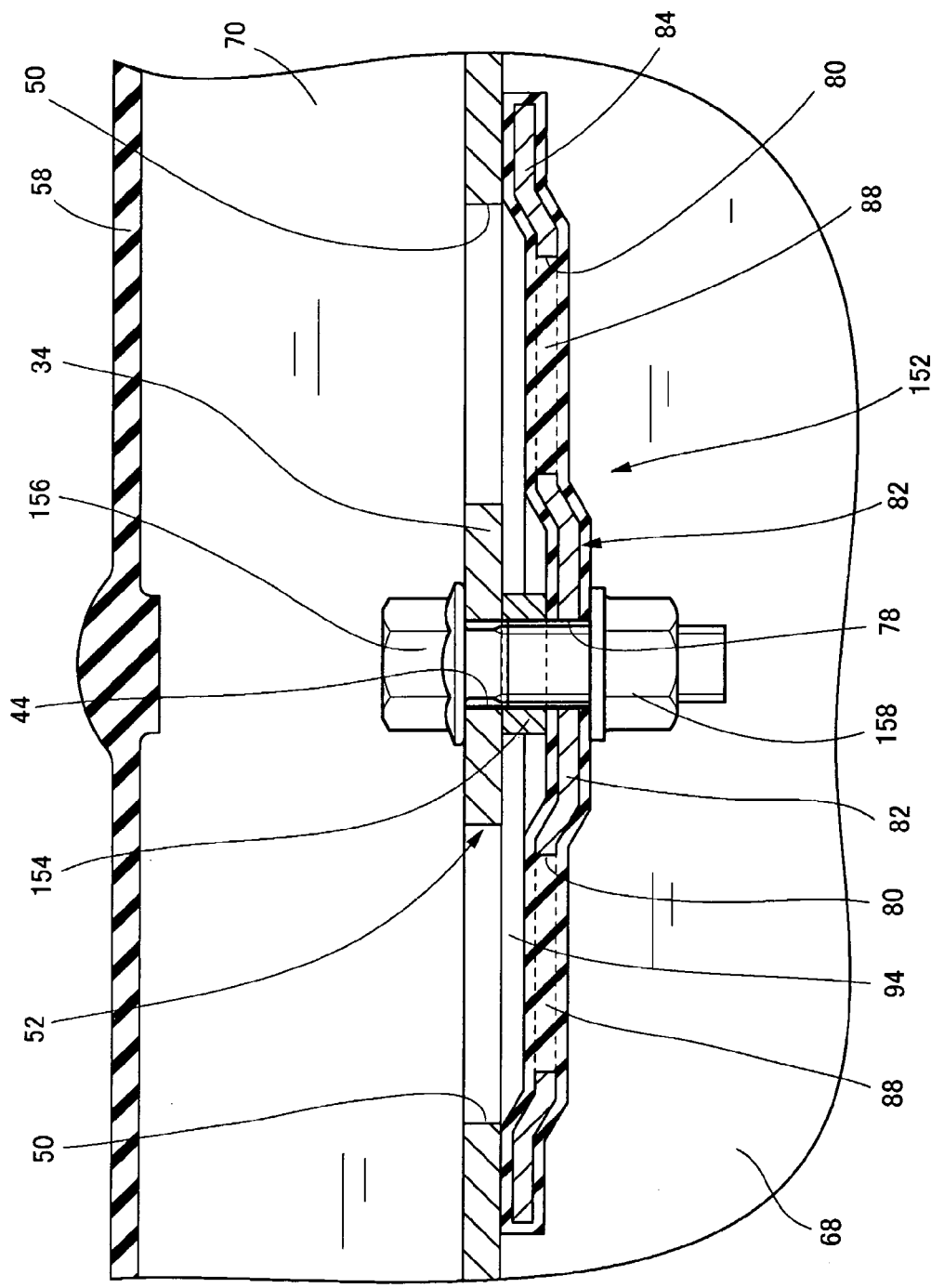
FIG. 11 is a fragmentally enlarged view in vertical cross section of an automotive engine mount of construction according to still another embodiment.

Further, in another possible arrangement as depicted in FIG. 11 for example, the movable cover member 152 has the form of a plate deflected in stepwise fashion such that, with its outside peripheral edge portion juxtaposed against the second partition fitting 34, the distance separating the second partition fitting 34 and the movable cover member 152 will increase from its outside peripheral edge towards a fastening portion 82 at the center. A sleeve spacer 154 is positioned between the second partition fitting 34 and the fastening portion 82 which is situated at maximum distance of separation from the second partition fitting 34. A fastening bolt 156 is passed through the center through-hole 44 of the second partition fitting 34, the bore of the sleeve spacer 154 and an insertion hole 78 of the movable cover member 152, and is fastened to the movable cover member 152 with a fastener nut 158, whereby the movable rubber films 88 of the movable cover member 152 are positioned spaced apart to the pressure receiving chamber 68 side from the open faces of the pressure receiving chamber 68 side-facing communicating holes 52 of the second partition fitting 34 to provide a gap 94 between the movable rubber films 88 and an open end face of the communicating holes 52.

Figure 12:
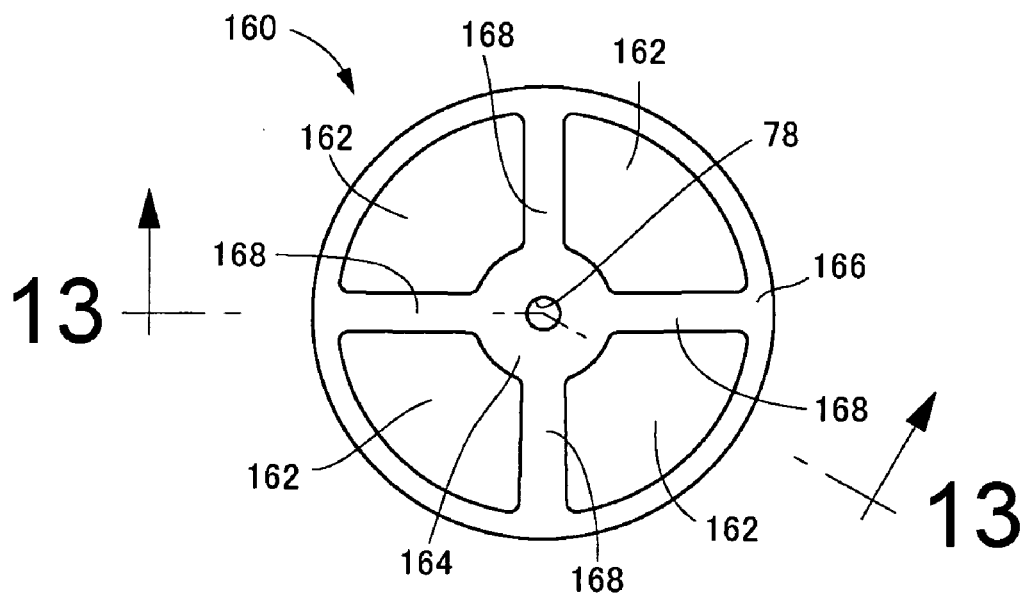
FIG. 12 is a fragmentally enlarged view in vertical cross section of an automotive engine mount of construction according to a still further embodiment.
Figure 13:
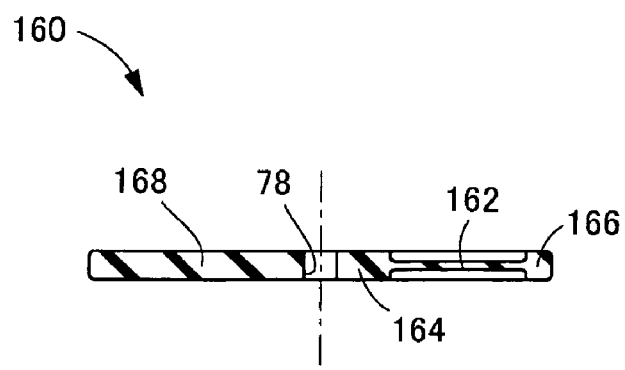
FIG. 13 is a cross sectional view taken along line 13-13 of FIG. 12.

Moreover, in the preceding embodiments, the fastening portion, the elastic retainer portions, and the annular retainer portion are formed by an elastic plate composed of a metal plate spring. However, in another possible arrangement as depicted in FIGS. 12 and 13 for example, the movable cover member 160 is a rubber material having a generally round disk shape in the diametrical medial section of which recesses of prescribed shape (in this specific example, fan-shaped) which open onto either side of the rubber material from its medial section in the thickness direction are formed at equidistant intervals in the circumferential direction. With this arrangement, a plurality of movable rubber films 162 are formed in the diametrical medial section which are thinner than the center section and outside peripheral edge portion of the material while being arranged at equidistant intervals in the circumferential direction, and a fastener portion 164 is formed by an annular shaped portion in the center section where an insertion hole 78 has been provided. An annular retainer portion 166 is defined by an outside peripheral edge portion of large-diameter annular shape situated a prescribed distance away diametrically outward from the fastener portion 164; and elastic retainer portions 168 which lie between the movable rubber films 162, 162 in the circumferential direction are defined by sections of the movable cover member 160 which extend in the radial direction. Thus, the fastener portion 164, the elastic retainer portions 168, and the annular retainer portion 166 may be integrally formed of the same rubber material as the movable rubber films 162.

In the preceding embodiments, only a single orifice passage 72 is provided, but it would also be acceptable to instead form two or more and tune them to different frequencies, to handle vibration which poses a problem over multiple or wide vibration frequency bands.

Additionally, while the preceding embodiments describe by way of specific example implementation of the present invention in an automotive engine mount, the present invention may be implemented analogously in an automotive body mounting or diff mounting, or in vibration damping devices for various non-automotive vibrating bodies generally.

What is claimed is:
1. A fluid filled type vibration damping device comprising:
a first mounting member;
a second mounting member;
a main rubber elastic body elastically connecting the first mounting member and the second mounting member;
a partition member fixedly supported on the second mounting member;
a pressure-receiving chamber disposed on one side of the partition member and partially defined by the main rubber elastic body;
an equilibrium chamber disposed on another side of the partition member and partially defined by a flexible film, the pressure receiving chamber and the equilibrium chamber being filled with a non-compressible fluid;
an orifice passage through which the pressure receiving chamber and the equilibrium chamber communicate with one another; and
a movable cover member juxtaposed against the partition member on a pressure receiving chamber side thereof to cover at least one communicating hole formed through the partition member for fluid communication between the pressure receiving chamber and the equilibrium chamber, wherein the movable cover member includes: a fastening portion fastened to the partition member and disposed in a center section of the movable cover member; at least one elastic retainer portion which elastically links the fastening portion to an outside peripheral edge of the movable cover member and which through urging force maintains the outside peripheral edge of the movable cover member in intimate contact against the partition member; and at least one movable rubber film provided in a zone to an inside peripheral side of the outside peripheral edge of the movable cover member, wherein with the outside peripheral edge of the movable cover member held in intimate contact against the partition member through the urging force of the elastic retainer portion, pressure of the pressure receiving chamber will act on a first face of the movable rubber film while pressure of the equilibrium chamber will act on another face of the movable rubber film through the communicating hole thereby constituting a pressure fluctuation absorbing mechanism, wherein the outside peripheral edge of the movable cover member is separated from the partition member in opposition to the urging force of the elastic retainer portion by negative pressure created in the pressure receiving chamber when vibration is input for releasing the outside peripheral edge of the movable cover member from intimate contact against the partition member, thereby creating a shunt gap and constituting a shunting mechanism for preventing excessive negative pressure from occurring in the pressure receiving chamber, wherein the elastic retainer portion of the movable cover member is formed of a metal plate spring material, wherein the movable cover member is juxtaposed in an axial direction against the partition member from a pressure receiving chamber side such that the outside peripheral edge portion is located outward of the fastening portion in the axial direction, so that an elastic recovery force of the elastic retainer portion acts as the urging force tending to restore the outside peripheral edge portion of the movable cover member to an original position thereof in the axial direction, and wherein the at least one elastic retainer portion comprises a plurality of elastic retainer portions which as a whole extend in a spoke-wise fashion from a center of the movable cover member.

2. The fluid filled type vibration damping device according to claim 1, wherein the orifice passage is formed extending in a circumferential direction through an outside peripheral portion of the partition member, and the at least one communicating hole is formed in a center section of the partition member.

3. The fluid filled type vibration damping device according to claim 1, wherein the movable rubber film is vulcanization bonded to the elastic retainer portion which is formed of an elastic material different from that of the movable rubber film.

4. The fluid filled type vibration damping device according to claim 1, wherein a gap is provided between a face of the movable rubber film of the movable cover member, and a face of the partition member onto which the communicating hole opens.

5. The fluid filled type vibration damping device according to claim 4, wherein the fastening portion for fastening to the partition member is provided in a center section of the movable cover member; the outside peripheral edge of the movable cover member is positioned in intimate contact surrounding the communicating holes of the partition member; and a medial section between the center section and the outside peripheral edge of the movable cover member is positioned in opposition to the face onto which the communicating hole opens in a direction of juxtaposition of the movable cover member and the partition member, with the gap provided about an entire circumference between these opposed faces.

6. The fluid filled type vibration damping device according to claim 1, wherein a continuous sealing rib is provided to the outside peripheral edge of the movable cover member about an entire circumference of a face thereof which is juxtaposed about the communicating hole of the partition member; and the sealing rib undergoes compressive deformation becoming positioned in intimate contact surrounding the communicating hole.

7. The fluid filled type vibration damping device according to claim 1, wherein the movable cover member as a whole has a flat plate shape.

8. The fluid filled type vibration damping device according to claim 1, wherein an annular retainer member is disposed at the outside peripheral edge of the movable cover member, and the outside peripheral edge of the elastic retainer portion is linked to the annular retainer member.

9. The fluid filled type vibration damping device according to claim 8, wherein the annular retainer member is formed of a spring material.

10. The fluid filled type vibration damping device according to claim 1, wherein the communicating hole of the partition member and the movable rubber film of the movable cover member have mutually corresponding planar surface shapes in a direction of their juxtaposition.

11. The fluid filled type vibration damping device according to claim 10, wherein the communicating hole and the movable rubber film which have mutually corresponding planar shapes are aligned in a circumferential direction as well as mutually overlapping in projection view in the direction of juxtaposition of the movable rubber film onto an open face of the communicating hole.

12. The fluid filled type vibration damping device according to claim 11, wherein a center section of the partition member is of a flat shape, the communicating hole takes the form of a through-hole which passes through the center section of the partition member about a center axis, and the fastening portion of the movable cover member is fastened at the center axis of the partition member.

* * * * *